United States Patent
Yano et al.

(10) Patent No.: US 9,046,012 B2
(45) Date of Patent: *Jun. 2, 2015

(54) VARIABLE VALVE OPERATING APPARATUS FOR INTERNAL COMBUSTION ENGINE

(75) Inventors: Toshiyuki Yano, Gotemba (JP); Shuichi Ezaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/824,496

(22) PCT Filed: Aug. 29, 2011

(86) PCT No.: PCT/JP2011/069470
§ 371 (c)(1),
(2), (4) Date: Mar. 18, 2013

(87) PCT Pub. No.: WO2012/063537
PCT Pub. Date: May 18, 2012

(65) Prior Publication Data
US 2013/0276731 A1 Oct. 24, 2013

(30) Foreign Application Priority Data
Nov. 8, 2010 (JP) ................. 2010-250033

(51) Int. Cl.
*F01L 1/34* (2006.01)
*F01L 1/344* (2006.01)
(Continued)

(52) U.S. Cl.
CPC . *F01L 1/344* (2013.01); *F01L 1/34* (2013.01); *F01L 1/356* (2013.01); *F01L 13/0026* (2013.01);
(Continued)

(58) Field of Classification Search
CPC ......... F01L 1/34; F01L 1/356; F01L 13/0026; F01L 2001/0473; F02D 13/0215

USPC .............. 123/90.15, 90.17, 90.16, 90.44; 464/160
See application file for complete search history.

(56) References Cited

U.S. PATENT DOCUMENTS 7,513,231 B2 * 4/2009 Ezaki et al. ............ 123/90.17
7,669,564 B2   3/2010 Tochiki et al.
(Continued)

FOREIGN PATENT DOCUMENTS

JP          47-20654       6/1972
JP          7-4217 A       1/1995
(Continued)

OTHER PUBLICATIONS

International Search Report Issued Nov. 29, 2011 in PCT/JP11/69470 Filed Aug. 29, 2011.
(Continued)

*Primary Examiner* — Ching Chang
(74) *Attorney, Agent, or Firm* — Oblon, McClelland, Maier & Neustadt, L.L.P.

(57) ABSTRACT

A variable valve operating apparatus for an internal combustion engine includes a drive camshaft, and a driven cam lobe that is rotatably supported by the drive camshaft. The variable valve operating apparatus further includes a control sleeve that has a raceway surface, a center of which is eccentric with respect to a center of rotation of its own. The variable valve operating apparatus further includes a link mechanism that is connected to each of the drive camshaft and the driven cam lobe and has a control roller which is in contact with the raceway surface. The variable valve operating apparatus further includes an actuator that drives the control sleeve. The variable valve operating apparatus further includes a control amount of the actuator is controlled to change a moving amount of the raceway surface in the above described plane direction in accordance with an operation condition of an internal combustion engine.

8 Claims, 12 Drawing Sheets

(51) Int. Cl.
  *F01L 1/356* (2006.01)
  *F01L 13/00* (2006.01)
  *F02D 13/02* (2006.01)
  *F01L 1/047* (2006.01)
  *F01L 1/053* (2006.01)
  *F02B 75/12* (2006.01)

(52) U.S. Cl.
  CPC .. *F01L 2001/0473* (2013.01); *F01L 2001/0537* (2013.01); *F02D 13/0215* (2013.01); *F02B 2075/125* (2013.01); *Y02T 10/18* (2013.01)
  USPC .................. 123/90.16; 123/90.15; 123/90.17

(56) References Cited

U.S. PATENT DOCUMENTS

2009/0241877 A1  10/2009  Hoshikawa et al.
2013/0213332 A1  8/2013   Yano et al.

FOREIGN PATENT DOCUMENTS

| JP | 9-4217 A | 1/1997 |
| JP | 2005 180238 | 7/2005 |
| JP | 2005 291014 | 10/2005 |
| JP | 2007 198252 | 8/2007 |
| JP | 2008-196497 A | 8/2008 |
| JP | 2009 57868 | 3/2009 |
| JP | 2009 92078 | 4/2009 |
| JP | 2010 196515 | 9/2010 |

OTHER PUBLICATIONS

Extended European Search Report issued Mar. 13, 2014 in European Patent Application No. 11839923.7.

Japanese Office Action dated Apr. 1, 2014 for application JP2012-5428334 with partial English translation.

U.S. Appl. No. 13/877,249, filed Apr. 1, 2013, Yano et al.

Notice of Allowance mailed Mar. 7, 2014 in co-pending U.S. Appl. No. 13/877,249.

Office Action mailed Jul. 17, 2014 in co-pending U.S. Appl. No. 13/877,249.

Notice of Allowance issued in U.S. Appl. No. 13/877,249 on Nov. 5, 2014.

* cited by examiner

VARIABLE VALVE OPERATING APPARATUS FOR INTERNAL COMBUSTION ENGINE

TECHNICAL FIELD

The present invention relates to a variable valve operating apparatus for an internal combustion engine, and particularly relates to a variable valve operating apparatus for an internal combustion engine which is capable of changing a rotational speed of a driven cam lobe for an interval in which a drive camshaft makes one rotation.

BACKGROUND ART

Conventionally, for example, Patent Document 1 discloses a valve operating apparatus for an internal combustion engine including a configuration in which an electric motor rotationally drives a drive camshaft to which a driven cam lobe which drives a valve is fixed. Further, the conventional valve operating apparatus includes a motor control device which controls the rotational speed of the electric motor. According to the configuration like this, the rotational speed of the electric motor is changed by the motor control device, and thereby the rotational speed of the driven cam lobe for an interval in which the drive camshaft makes one rotation can be increased and decreased.

The applicant recognizes the documents described as follows including the above described document, as the documents relating to the present invention.

CITATION LIST

Patent Documents

Patent Document 1: Japanese Laid-open Patent Application Publication No. 2005-180238
Patent Document 2: Japanese Laid-open Patent Application Publication No. 2009-57868

SUMMARY OF INVENTION

Technical Problem

In the variable valve operating apparatus that adopts an ordinary configuration which drives the drive camshaft by the rotational force of the crankshaft which is transmitted via a timing chain or timing belt, unlike the configuration of the conventional valve operating apparatus described above, there is also a demand to realize the function of making it possible to change the rotational speed of the driven cam lobe for an interval in which the drive camshaft makes one rotation. In order to enhance various performances (fuel consumption, output power, exhaust emission and the like) of the internal combustion engine which includes a variable valve operating apparatus having the above described function, it is desirable to perform control which takes advantage of the above described function.

The present invention is made to solve the problem as described above, and an object of the invention is to provide a variable valve operating apparatus for an internal combustion engine which can favorably enhance various performances of the internal combustion engine while realizing the function which can change a rotational speed of an driven cam lobe for an interval in which a drive camshaft makes one rotation, in a case of using a configuration which drives the drive camshaft by a rotational force of a crankshaft.

Solution to Problem

The present invention is a variable valve operating apparatus for an internal combustion engine, and includes a drive camshaft, a driven cam lobe, a guide member, a link mechanism, contact maintaining means, an actuator and control means.

The drive camshaft is rotationally driven by a rotational force of a crankshaft. The driven cam lobe is concentric with the drive camshaft, and is rotatably supported by the drive camshaft. The guide member has a raceway surface formed so as to surround the drive camshaft. The link mechanism is connected to each of the drive camshaft and the driven cam lobe, has a contact member which is in contact with the raceway surface, and changes a rotation angle of the driven cam lobe with respect to the drive camshaft in association with a positional change of the contact member with respect to a center of rotation of the drive camshaft. The contact maintaining means maintains contact between the contact member that revolves around the drive camshaft and the raceway surface, while the drive camshaft makes one rotation. The actuator moves the raceway surface in a plane direction orthogonal to an axial line of the drive camshaft. The control means controls a control amount of the actuator to change a moving amount of the raceway surface in the plane direction, in accordance with an operation condition of the internal combustion engine.

According to the present invention, the raceway surface is moved in the plane direction orthogonal to the axial line of the drive camshaft by the actuator, whereby the position of the raceway surface on the above described plane changes, and the positional change of the contact member of the link mechanism with respect to the center of rotation of the drive camshaft occurs. With this, the relative rotation angle of the driven cam lobe with respect to the drive camshaft for an interval in which the drive camshaft makes one rotation changes. As a result, the rotational speed of the driven cam lobe for the interval in which the drive camshaft makes one rotation changes in accordance with the control position of the raceway surface of the guide member. The present invention includes the control means that controls the control amount of the actuator to change the moving amount of the raceway surface in the above described plane direction in accordance with the operation condition of the internal combustion engine. By this, the relation between each operation condition and the control amount of the actuator is set in advance to obtain the characteristic (shape) of the desired lift curve in each operation condition, whereby various performances of the internal combustion engine can be favorably enhanced while the function of being able to change the rotational speed of the driven cam lobe in the interval in which the drive camshaft makes one rotation is realized in the case of using the configuration which drives the drive camshaft by the rotational force of the crankshaft.

Further, the actuator in the present invention may rotationally drive the guide member. The raceway surface may be a circumferential surface, and may be included by the guide member in a state in which a center of the raceway surface is eccentric with respect to a center of rotation of the guide member. The control amount of the actuator by the control means may be a rotation angle of the guide member.

According to the configuration as above, the variable valve operating apparatus can be realized, which can change the rotational speed of the driven cam lobe in the interval in which the drive camshaft makes one rotation by controlling the rotation angle of the guide member, by using the actuator having the configuration which moves the raceway surface having the center eccentric with respect to the center of rotation of the guide member in the above described plane direction by rotationally driving the guide member. According to the configuration as described above, the first and the second lift curves with the same or substantially the same operation angle values obtained, and with timings in which the lift amounts show peaks differing from each other are obtained when the rotation angle of the guide member which is the control amount of the actuator is changed.

Further, the control means in the present invention may include at least a first rotation angle and a second rotation angle as target values of the rotation angle of the guide member. The first rotation angle may be a rotation angle of the guide member at a time when a predetermined operation angle value for an operation angle of a valve which is driven by the driven cam lobe is obtained. The second rotation angle may be a rotation angle of the guide member at a time when a same or substantially the same operation angle value as the operation angle value which is obtained at a time of control to the first rotation angle is obtained, and when a second lift curve with timing in which a lift amount shows a peak differing as compared with a first lift curve of the valve which is obtained at the time of the control to the first rotation angle is obtained. The control means may discriminatingly use the first rotation angle and the second rotation angle under at least two kinds of operation conditions which differ in engine speed from each other.

By this, as compared with the conventional variable valve operating apparatus which can obtain only the lift curve with one characteristic (one shape) for one operation angle, control of the valve opening characteristic of the valve which can better satisfy demands in respective operation conditions can be performed by discriminatingly using, in accordance with the operation conditions, the first and the second lift curves with which the same or substantially the same operation angle values are obtained and the timings in which the lift amounts showing peaks differing.

Further, the valve in the present invention may be an intake valve. The second lift curve may be set so that timing in which the lift amount shows the peak is delayed as compared with the first lift curve. The control means may use the second rotation angle in an operation condition with a higher engine speed than an operation condition for which the first rotation angle is used.

The timing in which an amount of air easily enters the cylinder during the lift zone changes in accordance with the engine speed. More specifically, as the engine speed becomes higher, the above described timing becomes relatively later. According to the configuration as described above, a high lift amount of the intake valve can be ensured in the timing in which much air easily enters during the lift zone, irrespective of the value of the engine speed, and therefore, the amount of the air filled in the cylinder can be increased. Therefore, the output performance of the internal combustion engine can be enhanced.

Further, the second lift curve in the present invention may be set so that a lift amount in a predetermined section in a vicinity of a closing timing of the valve becomes small, as compared with the first lift curve.

By this, the decrease of the amount of the air filled in the cylinder due to the influence of blowback of the intake air can be prevented, at the time of use of the second lift curve.

Further, a valve which is driven by the driven cam lobe in the present invention may be an intake valve. When an acceleration request is issued at a time of a low engine speed, the control means may control the control amount of the actuator so that a relative rotational speed of the driven cam lobe with respect to the drive camshaft increases in a predetermined section in a vicinity of an opening timing of the intake valve.

According to the configuration as above, when an acceleration request is issued at the time of the low engine speed, a clearance between the piston and the intake valve can be ensured more sufficiently in the predetermined section in the vicinity of the opening timing of the intake valve. As a result, the opening timing of the intake valve is advanced significantly, and the valve overlap amount with the exhaust valve can be effectively increased. By this, in the state in which the intake pressure becomes higher than the exhaust pressure at the time of acceleration, the scavenging effect is enhanced by the increase of the valve overlap amount. As a result, the output performance of the internal combustion engine can be enhanced. Further, under the situation in which the intake pressure is lower than the exhaust pressure at the time of acceleration, the internal EGR gas amount increases by enlargement of the valve overlap amount. As a result, the fuel consumption performance and the exhaust emission performance of the internal combustion engine can be enhanced.

Further, when an engine speed is higher than a predetermined speed, the control means in the present invention may control the control amount of the actuator so that a relative rotational speed of the driven cam lobe with respect to the drive camshaft decreases in a predetermined section in a vicinity of a closing timing of a valve which is driven by the driven cam lobe.

By this, even under the situation in which the engine speed exceeds the normal use range for some reason, occurrence of an abnormal valve operation such as valve bounce can be avoided by reducing the rate of acceleration at the time of seating of the valve. Therefore, reliability of the variable valve operating apparatus can be enhanced.

DESCRIPTION OF EMBODIMENT

Embodiment 1

[System Configuration of an Internal Combustion Engine]

Figure 1:
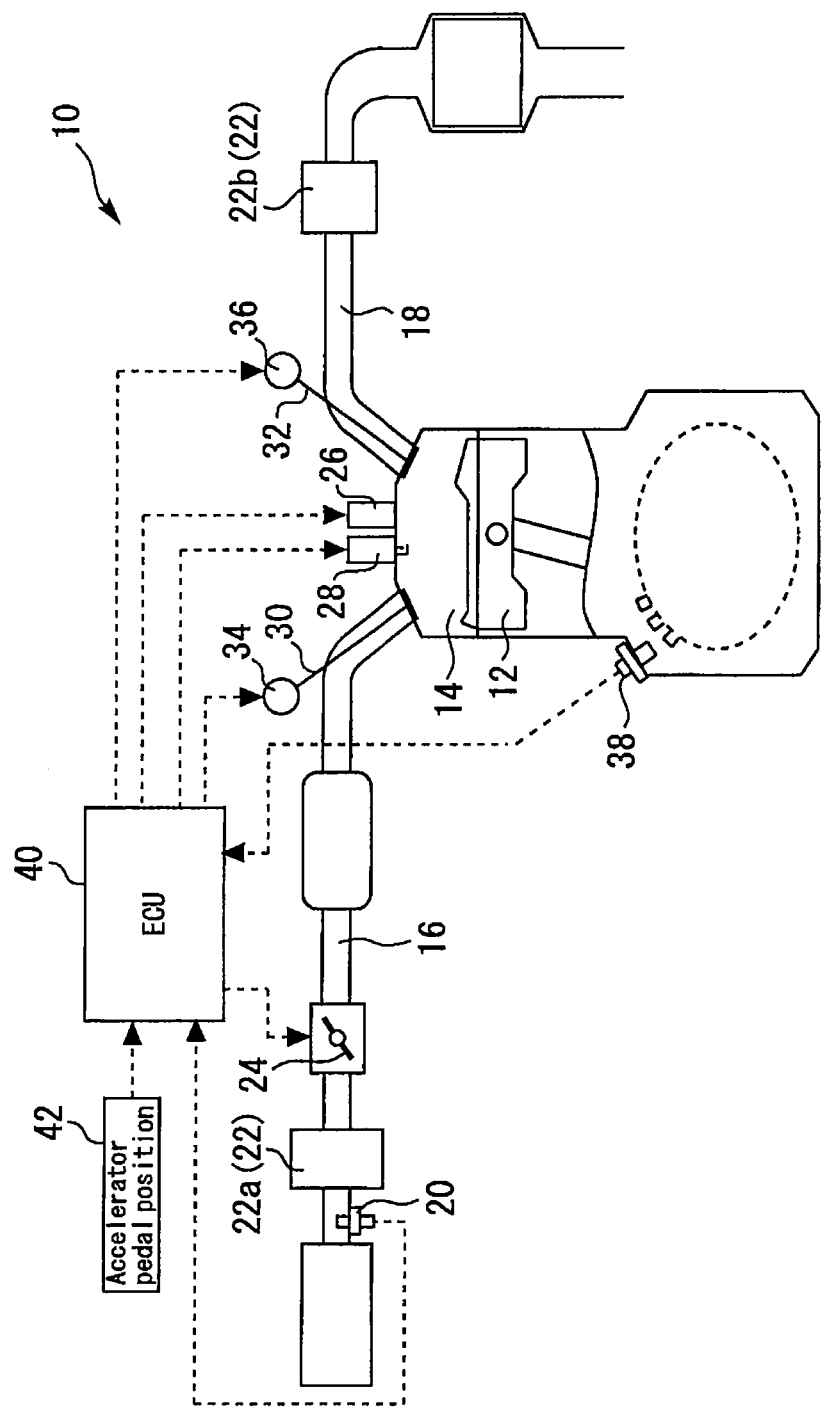
FIG. 1 is a view for explaining a system configuration of an internal combustion engine equipped with variable valve apparatuses of the present invention.

FIG. 1 is a view for explaining a system configuration of an internal combustion engine 10 equipped with variable valve apparatuses 34 and 36 of the present invention. Here, the internal combustion engine 10 is an in-line 4-cylinder type engine having four cylinders (#1 to #4) as an example.

A piston 12 is provided in a cylinder of the internal combustion engine 10. In the cylinder of the internal combustion engine 10, a combustion chamber 14 is formed atop the piston 12. An intake passage 16 and an exhaust passage 18 communicate with the combustion chamber 14. An air flow meter 20 which outputs a signal corresponding to a flow rate of air taken into the intake passage 16 is provided in the vicinity of an inlet of the intake passage 16.

A compressor 22a of a turbo supercharger 22 is disposed in the intake passage 16 at a downstream side of the air flow meter 20. Further, a turbine 22b of the turbo supercharger 22 is disposed in the exhaust passage 18. An electronically controlled throttle valve 24 is provided in the intake passage 16 at a downstream side from the compressor 22a. Further, each of the cylinders of the internal combustion engine 10 is provided with a fuel injection valve 26 for directly injecting a fuel into the combustion chamber 14 (into the cylinder), and an ignition plug 28 for igniting a mixture gas.

An intake port and an exhaust port are respectively provided with an intake valve 30 and an exhaust valve 32 for bringing the combustion chamber 14 and the intake passage 16, or the combustion chamber 14 and the exhaust passage 18 into a continuing state or a cutoff state. The intake valve 30 and the exhaust valve 32 are respectively driven by a variable intake valve operating apparatus 34 and a variable exhaust valve operating apparatus 36. Detailed configurations of these variable valve apparatuses 34 and 36 and operations thereof will be described later with reference to FIG. 2 to FIG. 9.

Further, the system shown in FIG. 1 includes an ECU (Electronic Control Unit) 40. Various sensors for detecting an operation state of the internal combustion engine 10 such as a crank angle sensor 38 for detecting an engine speed, and an accelerator position sensor 42 for detecting a pedal position of an accelerator of a vehicle equipped with the internal combustion engine 10 in addition to the aforementioned air flow meter 20 are connected to an input section of the ECU 40. Further, various actuators for controlling the operation of the internal combustion engine 10 such as the throttle valve 24, the fuel injection valve 26, the ignition plug 28 and the variable valve apparatuses 34 and 36 described above are connected to an output section of the ECU 40. The ECU 40 controls the operation state of the internal combustion engine 10 by driving the above described various actuators in accordance with predetermined programs and the sensor outputs.

Next, with reference to FIG. 2 to FIG. 10, configurations of the variable valve apparatuses 34 and 36 and operations thereof will be described in detail. Here, the variable intake valve operating apparatus 34 is described as an example, but the variable exhaust valve operating apparatus 36 is assumed to be basically configured similarly to the variable intake valve operating apparatus 34 except for a cam profile of a driven cam lobe and the like.

[Configuration of the Variable Valve Operating Apparatus]

Figure 2:
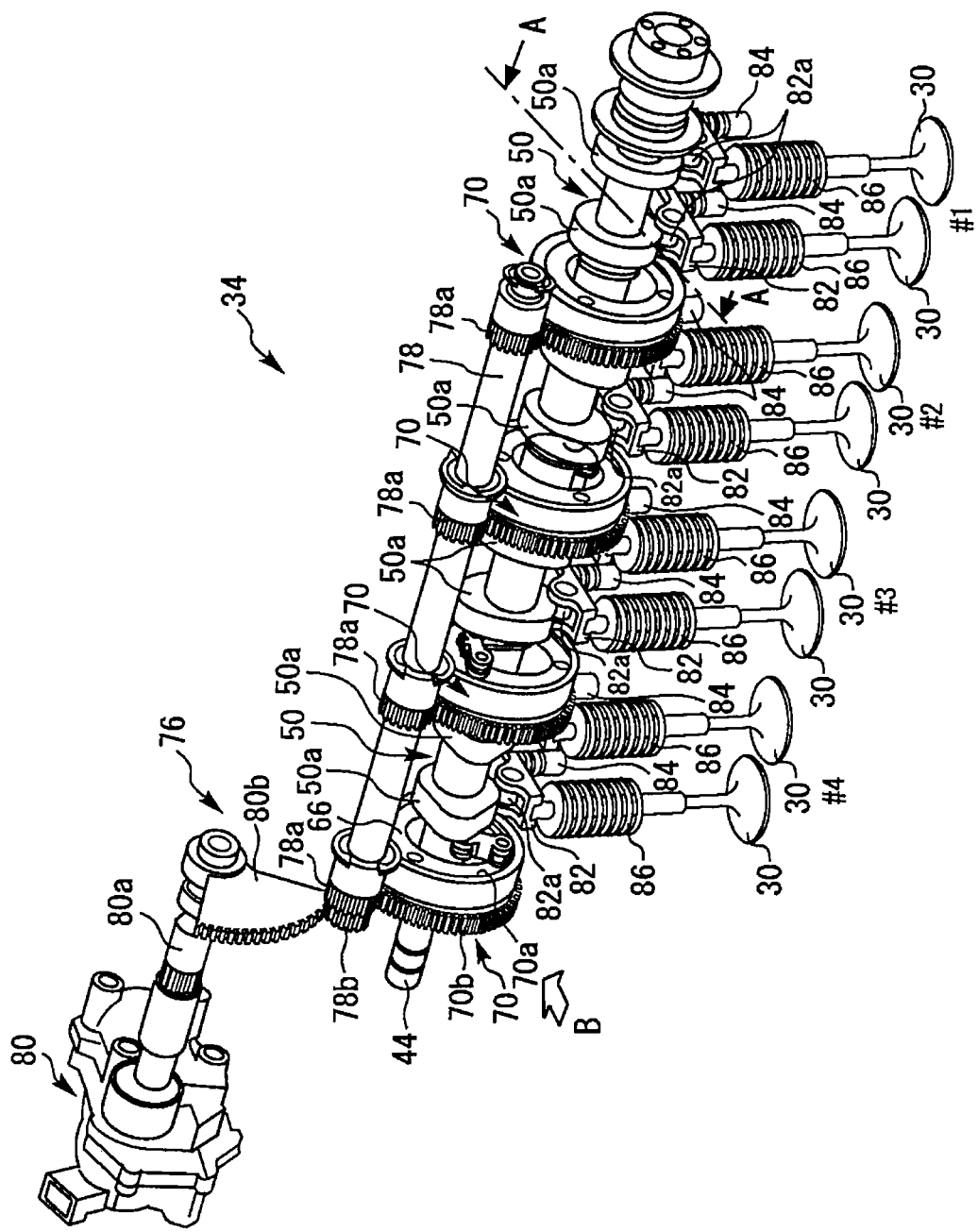
FIG. 2 is a perspective view schematically showing an entire configuration of the variable intake valve operating apparatus shown in FIG. 1.
Figure 3:
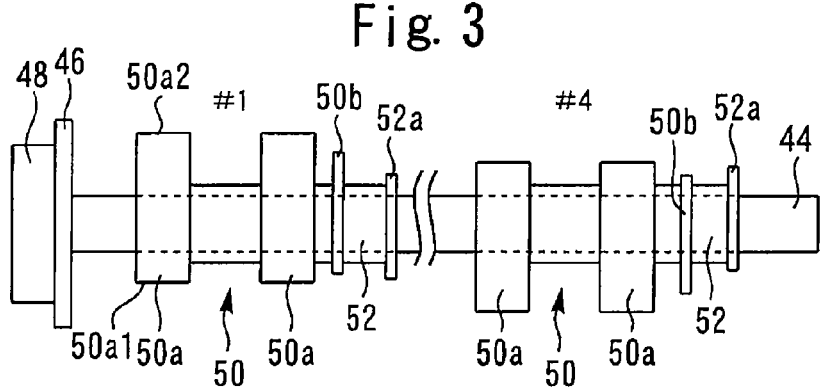
FIG. 3 is a view for explaining a configuration around a drive camshaft included by the variable intake valve operating apparatus shown in FIG. 1.

FIG. 2 is a perspective view schematically showing an entire configuration of the variable intake valve operating apparatus 34 shown in FIG. 1. FIG. 3 is a view for explaining a configuration around a drive camshaft 44 included by the variable intake valve operating apparatus 34 shown in FIG. 1.

As shown in FIGS. 2 and 3, the variable intake valve operating apparatus 34 includes the drive camshaft 44. The drive camshaft 44 is connected to a crankshaft (not illustrated) via a timing pulley 46, a timing chain and the like (not illustrated), and is configured to rotate at half speed of the crankshaft. As shown in FIG. 3, a known variable valve timing (VVT) mechanism 48 which can change a rotation phase of the drive camshaft 44 with respect to the rotation of the crankshaft is interposed between the drive camshaft 44 and the timing pulley 46. According to the VVT mechanism 48 like this, an opening timing and a closing timing (more specifically, an entire lift curve) can be changed to an advance side or a retard side in a crank angle base without changing an operation angle of the intake valve 30.

As shown in FIG. 3, on the drive camshaft 44, a cam piece 50 is mounted for each cylinder. The cam piece 50 is concentric with the drive camshaft 44, and is rotatably supported by the drive camshaft 44. At the cam piece 50, two driven cam lobes 50a for driving the intake valve 30 are formed. The driven cam lobe 50a includes a base circle part 50a1 in a circular arc shape coaxial with the drive camshaft 44, and a nose part 50a2 which is formed by expanding a part of the base circle toward an outside in a radial direction.

Further, on the drive camshaft 44, a drive arm 52 having a drive arm part 52a which projects to outside in the radial direction of the drive camshaft 44 is mounted for each cylinder. The drive arm 52 is integrally fixed to the drive camshaft 44 by using a predetermined fixing member (not illustrated). Further, a driven arm part 50b which projects to outside in the radial direction of the drive camshaft 44 is integrally formed at the cam piece 50 in the vicinity of the driven cam lobe 50a which is closer to the drive arm 52 for the same cylinder.

Figure 4:
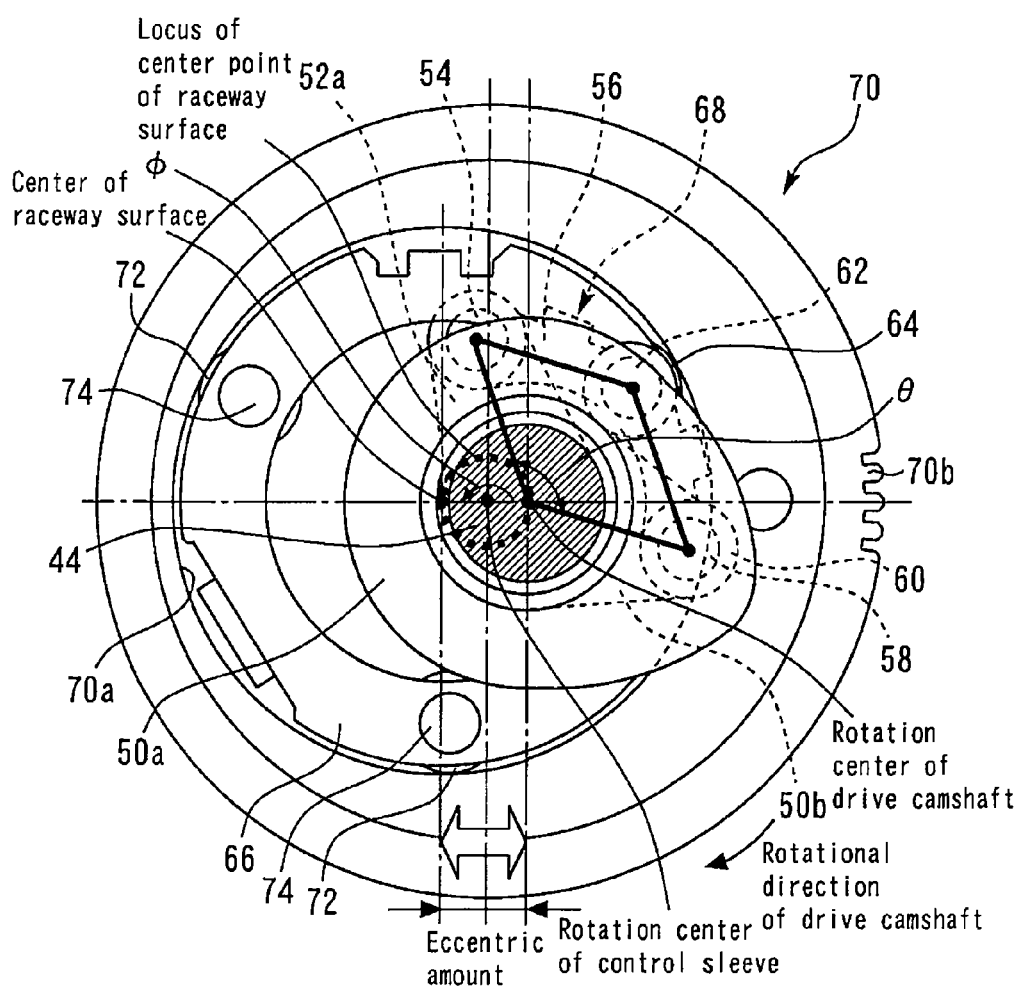
FIG. 4 is a sectional view of the variable intake valve operating apparatus cut along the A-A-line shown in FIG. 2.
Figure 5:
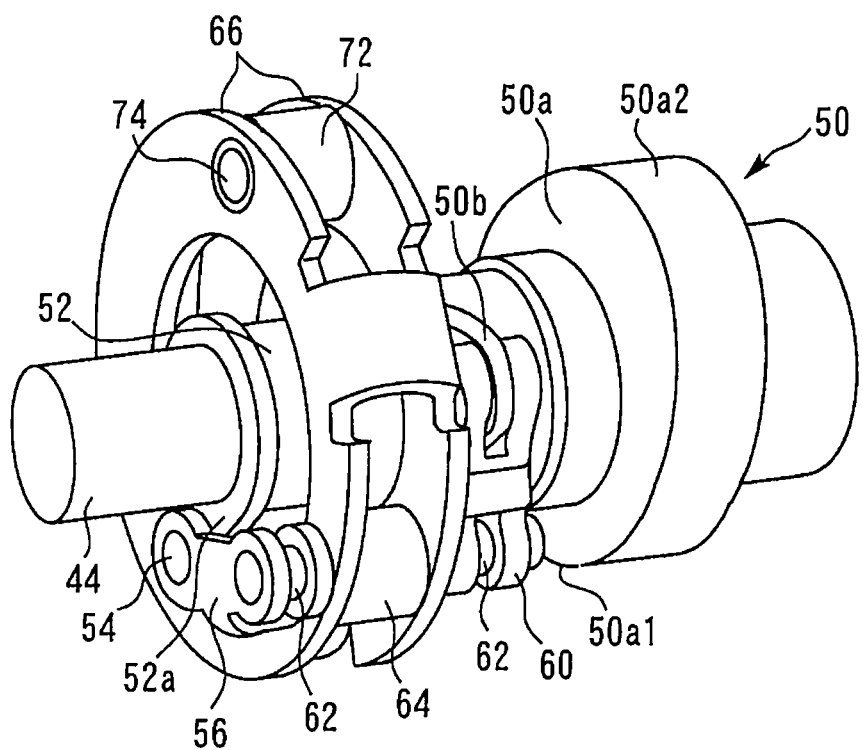
FIG. 5 is a perspective view of a configuration around the drive camshaft as seen from the arrow B direction in FIG. 2.

The description will be continued with FIG. 4 and FIG. 5 newly added.

FIG. 4 is a sectional view of the variable intake valve operating apparatus 34 cut along the A-A-line shown in FIG. 2. FIG. 5 is a perspective view of a configuration around the drive camshaft 44 as seen from the arrow B direction in FIG. 2. In FIG. 5, illustration of a control sleeve 70 is omitted.

As shown in FIGS. 4 and 5, one end of a drive link 56 is rotatably connected to the drive arm part 52a via a camshaft side rotary shaft 54. Further, one end of a driven link 60 is rotatably connected to the driven arm part 50b via a cam lobe side rotary shaft 58. Further, the other end of the drive link 56 and the other end of the driven link 60 are connected via a control roller side rotary shaft 62. A control roller 64 and a link plate 66 are interposed in a region between the drive link 56 and the driven link 60 on the control roller side rotary shaft 62.

As above, the variable intake valve operating apparatus 34 of the present embodiment includes a link mechanism 68 which is a four joint link connected into a pantograph shape (rhombus shape) as shown in FIG. 4 by the drive arm part 52a and the driven arm part 50b with an axial center of the drive camshaft 44 as a common center of rotation, and the drive link 56 and the driven link 60. Further, as shown in FIG. 4, in the present embodiment, the driven link 60 is disposed at a front side in the rotational direction of the drive camshaft 44 with respect to the drive link 56 in a state in which the control roller 64 is interposed between the driven link 60 and the drive link 56.

The link plate 66 is formed by two plate parts formed into ring shapes being folded to be concentric with each other as shown in FIG. 5. In a state in which the drive camshaft 44 is penetrated through an inside thereof, and the link plate 66 sandwiches the control roller 64 from outside, the link plate 66 is disposed on the control roller side rotary shaft 62.

As shown in FIG. 4, a raceway surface 70a of the control sleeve 70 is disposed at an outer circumferential side of the link plate 66 in such a manner as to surround the link plate 66 the inside of which is penetrated through by the drive camshaft 44. More specifically, the raceway surface 70a of the present embodiment is configured by a circumferential surface. Further, the above described control roller 64 is rotatably supported by the control roller side rotary shaft 62 at a position where the control roller 64 is in contact with the raceway surface 70a so as to be able to roll on the raceway surface 70a in conjunction with the rotation of the drive camshaft 44.

Further, as shown in FIG. 4, inside the link plate 66, two holding rollers 72 are rotatably mounted in positions where the two holding rollers 72 are in contact with the raceway surface 70a via holding rotary shafts 74, besides the control roller 64. More specifically, the three rollers 64 and 72 are mounted to the link plate 66 so that disposition of the three rollers 64 and 72 including the two holding rollers 72 in addition to the control roller 64 is at equiangular spaces with the drive camshaft 44 as a center. According to the configuration like this, the link plate 66 rotates inside the raceway surface 70a while the control roller 64 and the two holding rollers 72 roll on the raceway surface 70a, with rotation of the drive camshaft 44. More specifically, the link plate 66 has the position in the radial direction of the drive camshaft 44 defined by the raceway surface 70a via the control roller 64 and the holding rollers 72, and the position on the raceway surface 70a, of the control roller 64 which is mounted to the link plate 66 is defined. Therefore, the control roller 64 rolls on the raceway surface 70a in a state in which the control roller 64 is always in contact with the raceway surface 70a with rotation of the drive camshaft 44. As a result that the position of the control roller 64 is defined, a relative rotation angle θ of the driven cam lobe 50a with respect to the drive camshaft 44 is also determined via the drive link 56 and the driven link 60.

(Definition of the Rotation Angle θ)

In this case, the above described rotation angle θ is defined as an angle formed by a straight line (drive axis) connecting a center point of the drive camshaft 44 and a center point of the camshaft side rotary shaft 54, and a straight line (driven axis) connecting the center point of the drive camshaft 44 and a center of the cam lobe side rotary shaft 58, as seen from an axial direction of the drive camshaft 44, as shown in FIG. 4.

Further, the variable intake valve operating apparatus 34 of the present embodiment includes an actuator 76 for rotationally driving the control sleeve 70. As shown in FIG. 4, the raceway surface 70a is formed inside the control sleeve 70 in a state in which a center point of the raceway surface 70a is eccentric with respect to a center of rotation of the control sleeve 70 as seen from the axial direction of the drive camshaft 44. Accordingly, when the control sleeve 70 is rotated by the actuator 76 with the center of rotation of the control sleeve 70 as a center, the center point of the raceway surface 70a draws a circular locus as shown by the broken line in FIG. 4.

Further, in the configuration example shown in FIG. 4, a relative positional relation of the control sleeve 70 and the drive camshaft 44 is set so that the center of rotation of the drive camshaft 44 is located on the locus of the center point of the raceway surface 70a as seen from the axial direction of the drive camshaft 44.

Figure 6:
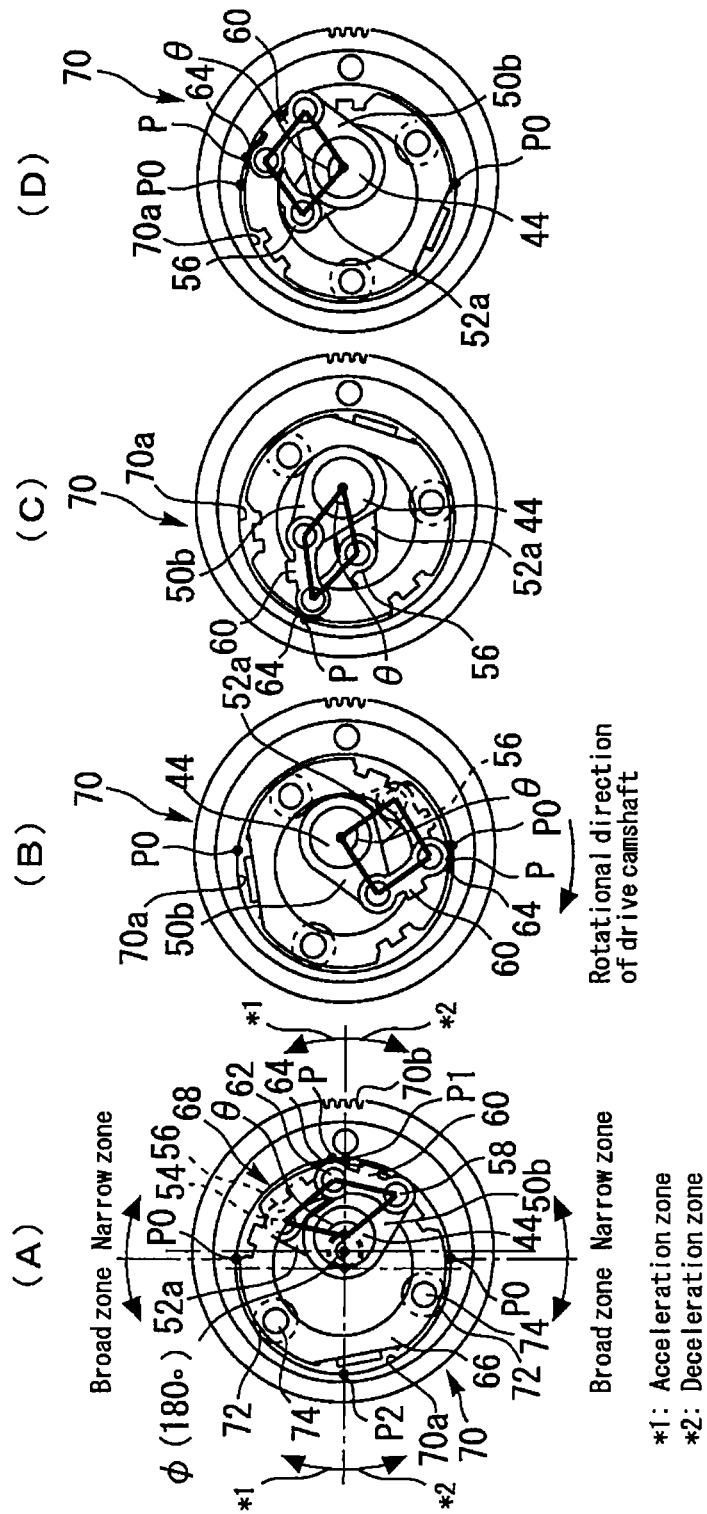
FIG. 6 is a view expressing an operation of a link mechanism for an interval in which the drive camshaft makes one rotation (mainly a change of the rotation angle θ during one rotation of the drive camshaft) as an example.

The above described control sleeves 70 are respectively disposed at each of the cylinders of the internal combustion engine 10 as shown in FIG. 2. On an outer periphery of each of the control sleeves 70, a gear 70b is formed over an entire circumference (only a part of the gear 70b is illustrated in FIG. 4 and FIG. 6 which will be described later).

Further, the variable intake valve operating apparatus 34 includes a control shaft 78 which is parallel with the drive camshaft 44 in the vicinity of the outer periphery of the control sleeve 70. On a circumferential surface of the control shaft 78, gears 78a which are meshed with the respective gears 70b of the respective, control sleeves 70 are provided. At one end part of the control shaft 78, a gear 78b different from the gear 78a is formed.

The gear 78b of the control shaft 78 is meshed with a gear 80b formed at a distal end of an output shaft 80a of an electric motor (hereinafter, simply described as "motor") 80. The control sleeve 70 is assumed to be rotatably supported by a cam housing (support member) not illustrated by using a predetermined fixing member (not illustrated). Further, the control shaft 78 is also assumed to be rotatably supported by the cam housing. In this connection, the motor 80 is driven on the basis of a command from an ECU 40 equipped with the internal combustion engine 10.

As described above, the actuator 76 is configured by the gears 70b formed at the control sleeves 70, the control shaft 78 which is connected to the control sleeves 70 via the gears 70b and the gears 78a, and the motor 80 which is connected to the control shaft 78 via the gear 78b and the gear 80b. According to the actuator 76 which is configured in this manner, a rotation position of the control sleeve 70 is adjusted by adjusting, on the basis of a command from the ECU 40, a rotation position of the control shaft 78 by use of the motor 80, and as a result, an eccentricity amount between the center of rotation of the drive camshaft 44 and a center of the raceway surface 70a can be adjusted.

(Definition of an Eccentric Angle φ)

Hereinafter, in the present specification, as the index for determining the eccentricity amount between the center of rotation of the drive camshaft 44 and the center of the raceway surface 70a, an "eccentric angle φ" will be used. Here, as shown in FIG. 4, the eccentric angle φ is defined as an angle formed by a straight line which extends to the center of rotation of the drive camshaft 44 from the center of rotation of the control sleeve 70 and a straight line which extends to the center point of the raceway surface 70a from the center of rotation of the control sleeve 70, as seen from the axial direction of the drive camshaft 44. More specifically, in the state in which the center point of the raceway surface 70a and the center point of the drive camshaft 44 correspond to each other, the eccentric angle φ is 0°. The eccentric angle φ is defined to be a larger value, as the center point of the raceway surface 70a rotates counterclockwise on the locus thereof to a larger extent in association with the rotation amount of the control sleeve 70 in the counterclockwise direction in FIG. 4 becoming larger. Further, in the state shown in FIG. 4 (more specifically, a state in which the center point of the raceway surface 70a is located in a position linearly symmetrical with the center of rotation of the drive camshaft 44 with the vertical line passing through the center of rotation of the control sleeve 70 set as a reference), the eccentric angle φ is 180°. The eccentricity amount of the center of rotation of the drive camshaft 44 and the center point of the raceway surface 70a becomes the maximum when the eccentric angle φ is 180°.

Further, below each of the driven cam lobes 50a of the respective cylinders, a rocker arm 82 is disposed for each intake valve 30 as shown in FIG. 2. A rocker roller 82a which is in contact with the driven cam lobe 50a is rotatably mounted on a central part of the rocker arm 82. Further, one end of the rocker arm 82 is supported by a valve stem of the intake valve 30, and the other end of the rocker arm 82 is rotatably supported by a hydraulic lash adjuster 84. The intake valve 30 is urged in a closing direction, that is, a direction to push up the rocker arm 82 by a valve spring 86.

[Operation of the Variable Intake Valve Operating Apparatus]

FIG. 6 is a view expressing an operation of the link mechanism 68 for an interval in which the drive camshaft 44 makes one rotation (mainly a change of the rotation angle θ during one rotation of the drive camshaft 44) as an example. More specifically, FIG. 6 is a view expressing the link mechanism 68 when the raceway surface 70a is in the same eccentric state as in the above described FIG. 4 (state in which the eccentric angle φ is 180°).

When the drive camshaft 44 rotates in the rotational direction of the drive camshaft 44 shown in FIG. 6, the rotational force of the drive camshaft 44 is transmitted to the drive link 56 via the drive arm part 52a which is integrally fixed to the drive camshaft 44. The rotational force of the drive camshaft 44 which is transmitted to the drive link 56 is transmitted to the driven cam lobe 50a which is formed integrally with the driven arm part 50b via the control roller side rotary shaft 62 and the driven link 60. In this manner, the rotational force of the drive camshaft 44 is transmitted to the driven cam lobe 50a via the link mechanism 68.

As a result, the respective elements of the link mechanism 68 and the driven cam lobe 50a are rotated in the same direction as the drive camshaft 44 synchronously with the rotation of the drive camshaft 44. At this time, as already described, the control roller 64 rolls on the raceway surface 70a in the state in which the control roller 64 is always in contact with the raceway surface 70a in a contact point P, and revolves around the drive camshaft 44.

The raceway surface 70a is a circumferential surface as already described. Therefore, when the center point of the raceway surface 70a corresponds to the center point of rotation of the drive camshaft 44 (when the eccentric angle φ is 0°), for an interval in which the control roller 64 makes one rotation on the raceway surface 70a in association with rotation of the drive camshaft 44, the distance between the center of rotation of the drive camshaft 44 and the center of rotation of the control roller 64 does not change, and the relative rotation angle θ of the driven cam lobe 50a with respect to the drive camshaft 44 does not change, unlike the eccentric state as shown in FIG. 6. Accordingly, in this case, the driven cam lobe 50a makes one rotation at an equal speed to the drive camshaft 44.

Meanwhile, in a state in which the center point of the raceway surface 70a is eccentric from the center of rotation of the control sleeve 70 as shown in FIG. 6 as an example, a distance between the center of rotation of the control roller 64 which revolves around the drive camshaft 44 while being guided by the raceway surface 70a and the center of rotation of the drive camshaft 44 changes for an interval in which the drive camshaft 44 makes one rotation, and as a result, the rotation angle θ changes. Here, the contact point P of the control roller 64 to the raceway surface 70a in a timing in which a value θ0 at the time of the eccentric angle φ being 0° (see FIG. 7 which will be described later) and the rotation angle θ become equal to each other is referred to as an "equal rotation angle point P0" as shown in FIG. 6(A) and the like.

(Definition of Narrow/Broad Zones)

The eccentric state shown in FIG. 6 is the state in which the rotation amount of the control sleeve 70 is regulated by the actuator 76 so that the eccentric angle φ becomes 180°, whereby the center point of the raceway surface 70a is located at a position linearly symmetrical with the center of rotation of the drive camshaft 44 with the vertical line passing through the center of rotation of the control sleeve 70 as a reference. In this state, when the control roller 64 is located at a substantially right half side of the raceway surface 70a, a distance between the center of rotation of the drive camshaft 44 and the center of rotation of the control roller 64 is made smaller than the distance at the time when the eccentric angle φ is 0° (more specifically, when the rotation angle θ is always 00). In the following description, a zone of the raceway surface 70a (zone at the substantially right half side in the case of FIG. 6) in which the above described distance is made smaller than the distance at the time when the contact point P is at the equal rotation angle point P0 will be simply referred to as a "narrow zone".

When the above described distance is reduced as shown in FIG. 6(A), the rotation angle θ is increased as compared with the value (θ0) at the time when the contact point P is at the equal rotation angle point P0. The rotational direction of the drive camshaft 44 is clockwise in FIG. 6. Accordingly, when the above described rotation angle θ is increased in the above described narrow zone, the rotation position of the driven cam lobe 50a is advanced to the front side in the rotational direction of the drive camshaft 44, as compared with that at the time when the contact point P is at the equal rotation angle point P0.

Meanwhile, when the control roller 64 is located at a substantially left half side of the raceway surface 70a in association with rotation of the drive camshaft 44 in the eccentric state shown in FIG. 6 (in the case of FIG. 6(C)), the above described distance is increased as compared with that at the time when the contact point P is at the equal rotation angle point P0, contrary to the above description. In the following description, a zone of the raceway surface 70a in which the above described distance is increased (zone at the substantially left half side in the case of FIG. 6) will be simply referred to as a "broad zone". In the broad zone, the above described rotation angle θ decreases as compared with that at the time when the contact point P is at the equal rotation angle point P0. As a result, in the above described broad zone, the rotation position of the driven cam lobe 50a is delayed to the rear side in the rotational direction of the drive camshaft 44 as compared with that at the time when the contact point P is at the equal rotation angle point P0.

An operation of the link mechanism 68 during one rotation of the drive camshaft 44 shown in each view in FIG. 6 will be described in more detail. In a timing in which the contact point P between the control roller 64 and the raceway surface 70a is located in the narrow zone as shown in FIG. 6(A), the relative rotation angle θ of the driven cam lobe 50a to the drive camshaft 44 increases with respect to the value θ0 in the case of the eccentric angle φ being 0° (equal speed time). Further, in a timing shown in FIG. 6(B), the contact point P is located in a position near the aforementioned equal rotation angle timing P0, and therefore, the rotation angle θ is close to the value in the case of the eccentric angle φ being 0° (equal speed time). Further, in a timing in which the contract point P is located in the broad zone as shown in FIG. 6(C), the above described rotation angle θ reduces with respect to the value θ0 at the equal speed time. Thereafter, in a timing in which the contact point P enters the narrow zone again from the broad zone as shown in FIG. 6(D), the rotation angle θ increases again. As above, according to the variable intake valve operating apparatus 34 of the present embodiment, the center of rotation of the drive camshaft 44 and the center of the raceway surface 70a are made eccentric from each other by rotating the control sleeve 70 (more specifically, the eccentric angle φ is set to the angle other than 0°), whereby the relative rotation angle θ of the driven cam lobe 50a to the drive camshaft 44 for an interval in which the drive camshaft 44 makes one rotation can be made variable. The rotation angle θ can be changed in this manner, whereby the rotational speed of the driven cam lobe 50a for an interval in which the drive camshaft 44 makes one rotation can be increased and decreased with respect to the rotational speed of the drive camshaft 44.

(Definition Acceleration/Deceleration Zone)

In the eccentric state shown in FIG. 6, when the contact point P of the control roller 64 is located at the point P1 in the narrow zone at the substantially right half side of the raceway surface 70a, the distance between the center of rotation of the drive camshaft 44 and the center of rotation of the control roller 64 becomes the smallest, and the rotation angle θ between the drive shaft and the driven shaft is the most increased. Meanwhile, in this eccentric state, when the contact point P of the control roller 64 is located at a point P2 in the broad zone at the substantially left half side of the raceway surface 70a, the distance between the center of rotation of the drive camshaft 44 and the center of rotation of the control roller 64 becomes the largest, and the rotation angle θ between the drive shaft and the driven shaft is the most reduced. More specifically, while the contact point P of the control roller 64 moves toward the point P1 from the point P2, the change amount of the rotation angle θ per unit cam angle increases, and therefore, the rotational speed of the driven cam lobe 50a becomes higher than the rotational speed of the drive camshaft 44 (accelerates), whereas while the contact point P of the control roller 64 moves toward the point P2 from the point P1, the change amount of the rotation angle θ per unit cam angle decreases, and therefore, the rotational speed of the driven cam lobe 50a becomes lower than the rotational speed of the drive camshaft 44 (decelerates). Therefore, in the following description, the zone from the point P2 to the point P1 on the raceway surface 70a will be simply described as an "acceleration zone", and the zone from the point P1 to the point P2 on the raceway surface 70a will be simply described as a "deceleration zone".

Figure 7:
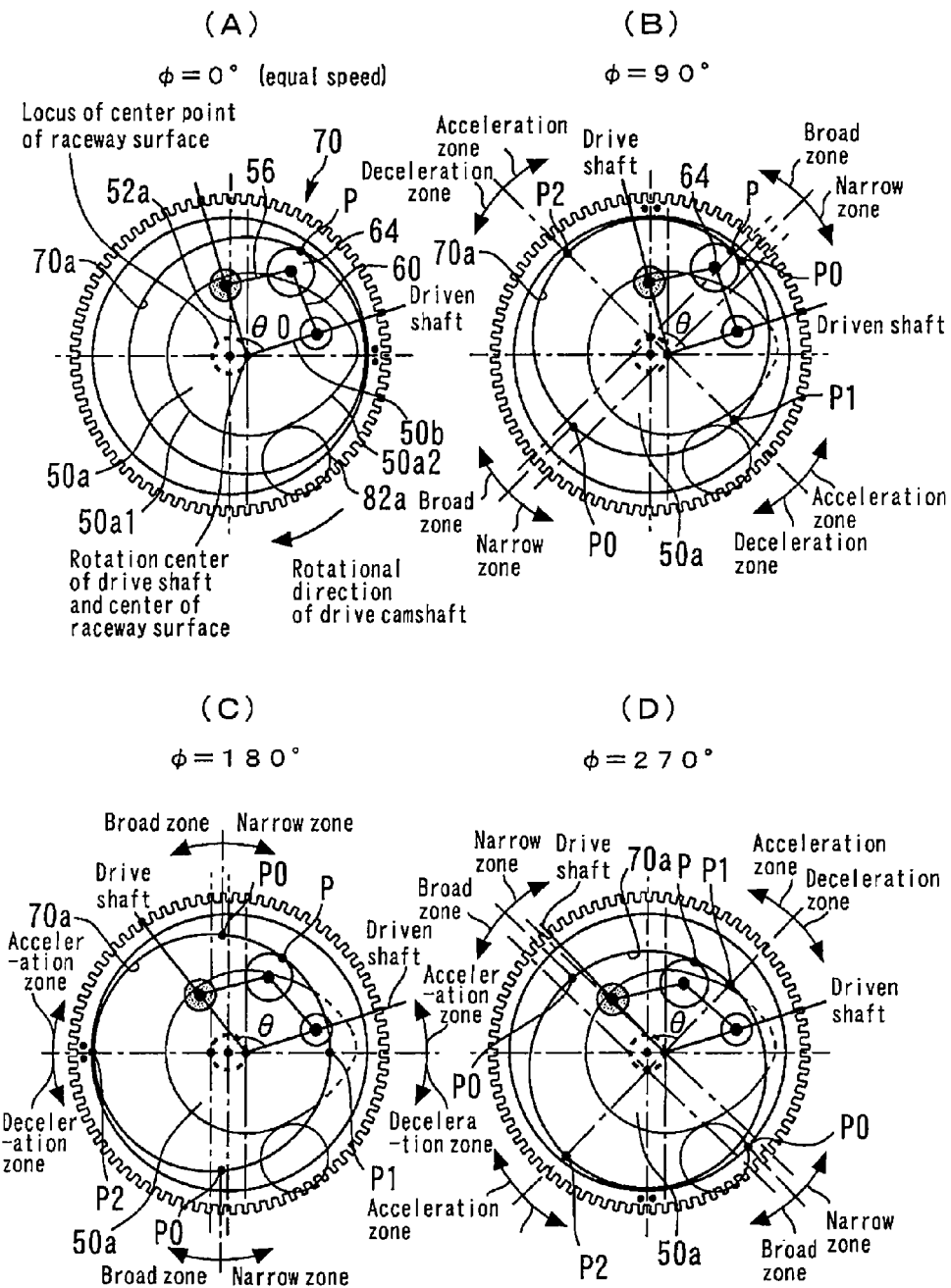
FIG. 7 is a schematic view for explaining the operations of the variable intake valve operating apparatus when the eccentric angle φ is changed by 90° at a time.
Figure 8:
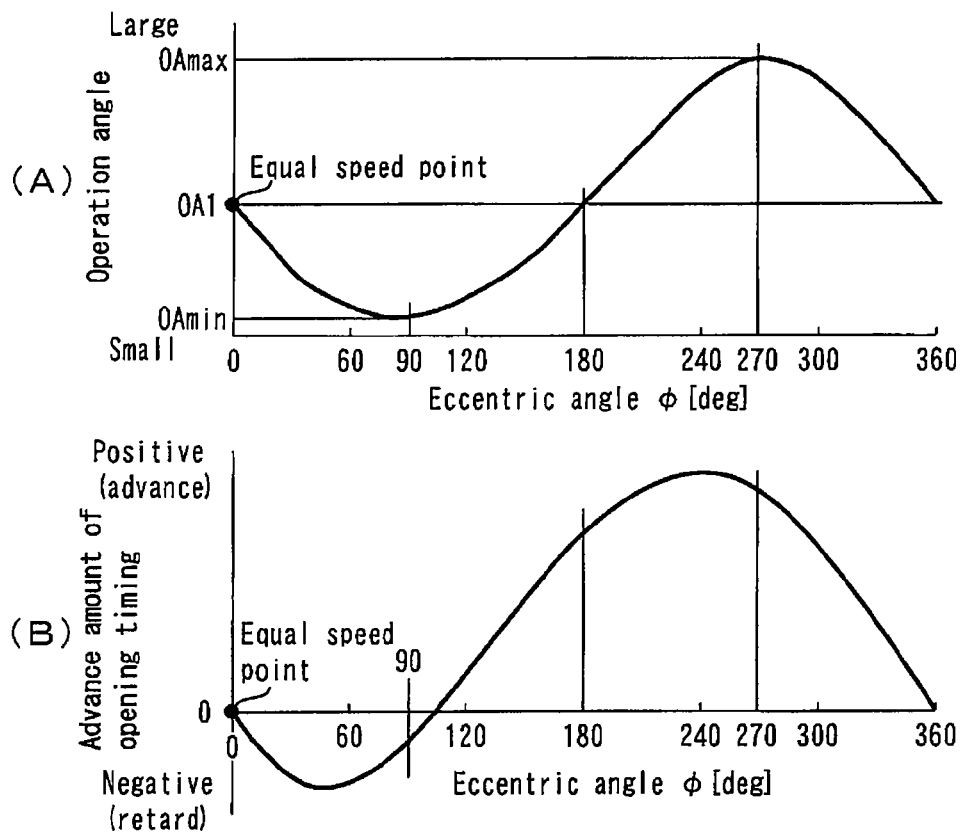
FIG. 8 is a diagram expressing a tendency of a change of valve opening characteristics of an intake valve in association with a change of the eccentric angle φ in the variable intake valve operating apparatus.
Figure 9:
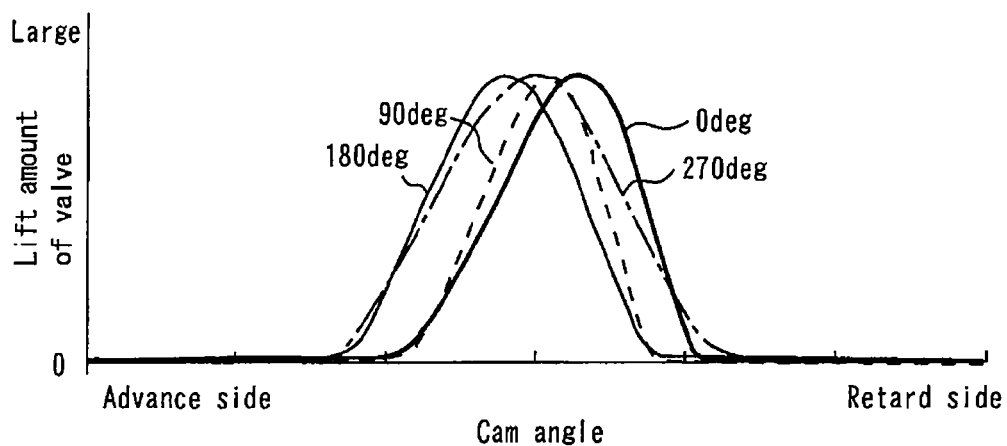
FIG. 9 is a diagram expressing each lift curve of the intake valve which is obtained when the eccentric angle φ is changed by 90° at a time.

FIG. 7 is a schematic view for explaining the operations of the variable intake valve operating apparatus 34 when the eccentric angle φ is changed by 90° at a time. FIG. 8 is a diagram expressing a tendency of a change of valve opening characteristics of the intake valve 30 in association with a change of the eccentric angle φ in the variable intake valve operating apparatus 34. More specifically, FIG. 8(A) is a diagram expressing a tendency of the change of the operation angle of the intake valve 30 in association with the change of the eccentric angle φ, and FIG. 8(B) is a diagram expressing a tendency of a change of an opening timing of the intake valve 30 in association with the change of the eccentric angle φ. Further, FIG. 9 is a diagram expressing each lift curve of the intake valve 30 which is obtained when the eccentric angle φ is changed by 90° at a time. Each drawing in FIG. 7 expresses an operation state of the variable intake valve operating apparatus 34 (particularly, the link mechanism 68) in the timing at which the contact point with the rocker roller 82a in the driven cam lobe 50a is switched to the nose part 50a2 from the base circle part 50a1 (more specifically, timing at which the opening timing of the intake valve 30 arrives).

First, an operation state shown in FIG. 7(A) is the state in which the eccentric angle φ is 0°, that is, the state in which the center of rotation of the drive camshaft 44 and the center of the raceway surface 70a correspond to each other. In this case, the driven cam lobe 50a makes one rotation at an equal speed to the drive camshaft 44 as described above. Further, the operation angle of the intake valve 30 which is obtained in this case will be set as "OA1" hereinafter as shown in FIG. 8 for convenience of explanation.

Next, an operation state shown in FIG. 7(B) (eccentric angle φ=90° will be described. The operation state is obtained by rotating the control sleeve 70 by 90° in a counterclockwise direction in FIG. 7 with respect to the operation state shown in FIG. 7(A). When the "acceleration zone" and the "deceleration zone" which are defined as described above are applied to the operation state shown in FIG. 7(B), the result is as shown in FIG. 7(B). Here, when the operation angle of the intake valve 30 in the reference state (state at the time of equal speed shown in FIG. 7(A)) is an ordinary value (value larger than 180° by a predetermined amount in crank angle), the cam angle becomes a value with a value of half the above described predetermined amount being added to 90° in the time period in which the nose part 50a2 of the driven cam lobe 50a presses the rocker roller 82a. As a result, the control roller 64 in the lift zone of the intake valve 30 substantially passes through the acceleration zone. Therefore, the operation angle of the intake valve 30 in the operation state shown in FIG. 7(B) becomes smaller than that in the equal speed state shown in FIG. 7(A), as shown in FIG. 8(A) and FIG. 9.

More specifically, as the eccentric angle φ is changed toward 90° from 0°, the operation angle of the intake valve 30 becomes gradually smaller as shown in FIG. 8(A), with increase of the eccentricity amount between the center of rotation of the drive camshaft 44 and the center of rotation of the raceway surface 70a under the situation in which the lift zone of the intake valve 30 and the acceleration zone of the control roller 64 overlay each other. However, the tendency of the change of the operation angle of the intake valve 30 in association with change of the eccentric angle φ changes in accordance with setting of the respective components of the variable intake valve operating apparatus 34 (the angle formed by the driven cam lobe 50a and the driven arm part 50b (driven shaft), the ratio of the lengths of the respective links of the link mechanism 68, or the like). In the case of setting of the variable intake valve operating apparatus 34 shown in FIG. 7, when the eccentric angle θ is a value around 90°, a minimum operation angle OAmin within a variable range of the operation angle in the variable intake valve operating apparatus 34 is obtained as the opening angle of the intake valve 30, as shown in FIG. 8(A).

Further, in the operation state shown in FIG. 7(B), the contact point P of the control roller 64 is located in the broad zone (zone in which the rotation angle θ becomes smaller than the rotation angle θ0 at the time of the equal rotation angle point P0) in the timing at which the opening timing of the intake valve 30 arrives. Therefore, the opening timing of the intake valve 30 in this operation state becomes a value at the retard side with respect to the value at the time of equal speed as shown in FIG. 8(B) and FIG. 9. Further, in the case of the setting of the present variable intake valve operating apparatus 34, when the eccentric angle φ is changed toward 90° from 0°, the retard amount of the opening timing of the intake valve 30 decreases after the retard amount temporarily increases as shown in FIG. 8(B).

Next, an operation state shown in FIG. 7(C) (eccentric angle φ=180°) will be described. The operation state is obtained by further rotating the control sleeve 70 by 90° in the counterclockwise direction in FIG. 7, with respect to the operation state shown in FIG. 7(B). When the "acceleration zone" and the "deceleration zone" are applied to the operation state shown in FIG. 7(C), the result is as shown in FIG. 7(C). More specifically, the contact point P of the control roller 64 to the raceway surface 70a is located in the acceleration zone at the initial time of start of lift operation of the intake valve 30, and is thereafter switched to the deceleration zone from halfway through the lift operation. Especially in the case of the setting of the variable intake valve operating apparatus 34 shown in FIG. 7, the action of acceleration in the first half portion of the lift zone of the intake valve 30 and the action of deceleration in the latter half portion thereof cancel out each other, and as a result, the operation angle of the intake valve 30 becomes the same value OA1 as that at the time of equal speed as shown in FIG. 8(A).

Further, as the eccentric angle φ is changed toward 180° from 90°, the ratio of the deceleration zone in the lift zone of the intake valve 30 increases, and therefore, the operation angle of the intake valve 30 becomes larger as shown in FIG. 8(A).

Further, in the operation state shown in FIG. 7(C), at a timing at which the opening timing of the intake valve 30 arrives, the contact point P of the control roller 64 is located in the narrow zone (zone in which the rotation angle θ becomes larger than the rotation angle θ0 at the time of the equal rotation angle point P0). Therefore, the opening timing of the intake valve 30 in this operation state has a value at an advance side with respect to the value at the time of equal speed, as shown in FIG. 8(B) and FIG. 9. Further, in the case of the setting of the present variable intake valve operating apparatus 34, when the eccentric angle φ is changed toward 180° from 90°, the advance amount of the opening timing of the intake valve 30 gradually increases as shown in FIG. 8(B).

Next, an operation state (eccentric angle φ=270° shown in FIG. 7(D) will be described. This operation state is obtained by further rotating the control sleeve 70 by 90° in the counterclockwise direction in FIG. 7 with respect to the operation state shown in FIG. 7(C). When the "acceleration zone" and the "deceleration zone" are applied to the operation state shown in FIG. 7(D), the result is as shown in FIG. 7(D). As a result, the control roller 64 in the lift zone of the intake valve 30 is located in the acceleration zone at the initial time of start of lift, but mainly passes through the deceleration zone. Therefore, the operation angle of the intake valve 30 in the operation state shown in FIG. 7(D) becomes larger than that in the equal speed state shown in FIG. 7(A).

More specifically, when the eccentric angle φ is changed toward 270° from 180°, the ratio of the deceleration zone in the lift zone of the intake valve 30 increases, and therefore, the operation angle of the intake valve 30 becomes gradually large as shown in FIG. 8(A). In the case of the setting of the variable intake valve operating apparatus 34 shown in FIG. 7, when the eccentric angle φ is at a value around 270°, a maximum operation angle OAmax within the variable range of the operation angle in the variable intake valve operating apparatus 34 is obtained as the opening angle of the intake valve 30, as shown in FIG. 8(A).

Further, in the operation state shown in FIG. 7(D), at the timing at which the opening timing of the intake valve 30 arrives, the contact point P of the control roller 64 is located in the narrow zone (the zone in which the rotation angle θ becomes larger than the rotation angle θ0 at the time of the equal rotation angle point P0). Therefore, the opening timing of the intake valve 30 in this operation state is at a value at the advance side with respect to the value at the time of equal speed, substantially similarly to the case of 180°, as shown in FIG. 8(B) and FIG. 9. Further, in the case of the setting of the present variable intake valve operating apparatus 34, when the eccentric angle φ is changed toward 270° from 180°, the advance amount of the opening timing of the intake valve 30 temporarily increases and thereafter, decreases, as shown in FIG. 8(B).

Finally, the operation of the variable intake valve operating apparatus 34 when the eccentric angle φ changes to 360° (0°) from 270°, that is, when the operation state is returned to the operation state shown in FIG. 7(A) from the operation state shown in FIG. 7(D) will be described. As the eccentric angle φ is changed toward 360° from 270°, the operation angle of the intake valve 30 becomes gradually smaller toward the value OA1 at the time of equal speed as shown in FIG. 8(A) with decrease in the eccentricity amount between the center of rotation of the drive camshaft 44 and the center of the raceway surface 70a under the situation in which the lift zone of the intake valve 30 and the deceleration zone of the control roller 64 overlay each other. Further, as for the advance amount of the opening timing of the intake valve 30 when the eccentric angle φ changes to 360° (0°) from 270°, the difference from the value at the time of equal speed also becomes gradually smaller with decrease of the eccentricity amount.

As described above, according to the variable intake valve operating apparatus 34 of the present embodiment, the eccentric angle φ is changed by rotationally driving the control sleeve 70 including the raceway surface 70a the center of which is eccentric with respect to the center of rotation of the control sleeve 70, whereby the distance between the center of rotation of the drive camshaft 44 and the center of rotation of the control roller 64 is changed. As a result, the relative rotation angle θ of the driven cam lobe 50a with respect to the drive camshaft 44 for an interval in which the drive camshaft 44 makes one rotation changes. In other words, the center of revolution of the control roller 64 which revolves around the drive camshaft 44 by rolling along the raceway surface 70a is changed in accordance with the eccentric angle φ which is adjusted like this. Consequently, according to the present variable intake valve operating apparatus 34, the rotational speed of the driven cam lobe 50a for an interval in which the drive camshaft 44 makes one rotation can be continuously increased and decreased with respect to the rotation angle of the drive camshaft 44, in accordance with the control position of the raceway surface 70a (rotation position of the control sleeve 70) in association with adjustment of the eccentric angle φ by the actuator 76. Thereby, the operation angle of the intake valve 30 can be made continuously variable in accordance with the control position of the raceway surface 70a as shown in FIG. 8(A) and FIG. 9. According to the variable intake valve operating apparatus 34, if the VVT mechanism 48 is also used in addition to the control of the eccentric angle φ, the opening timing of the intake valve 30 can be regulated to be in any timing with respect to the value obtained by control of the eccentric angle φ.

According to the variable intake valve operating apparatus 34 which is configured as above, the operation angle of the intake valve 30 can be made continuously variable in the following characteristic mode. More specifically, the operation angle can be made variable in both directions of a reducing direction and an increasing direction, in the mode in which when the control sleeve 70 is rotated in one direction, the operation angle of the intake valve 30 becomes large after becoming small, and thereafter, becomes small again. On top of it, according to the present variable intake valve operating apparatus 34, in what timing in the lift zone, the acceleration/deceleration zones arrive gradually becomes different, and the acceleration and deceleration amounts gradually becomes different, when the control sleeve 70 is rotated in one direction and the eccentric angle φ is continuously changed. While the relation between the lift zone and the acceleration/deceleration zones changes as above, and the acceleration and deceleration amounts in the lift zone change, the eccentric angles φ at which the operations of acceleration and deceleration as the total of adding up the operation of acceleration and the operation of the deceleration in the lift zone are equal (that is, the operation angles are equal) appear as two points like, for example, 0° and 180°. As a result, the operation angle can be said to increase and decrease with respect to the change in one direction of the eccentric angle φ in the curve as shown in FIG. 8(A). However, the control sleeve 70 for making the operation angle variable is not limited to the one that is driven in one predetermined direction, but may be driven in both directions (reciprocating direction) in accordance with necessity.

Further, in the variable intake valve operating apparatus 34 of the present embodiment, the raceway surface 70a is formed into a circumferential surface, and the relative positional relation between the control sleeve 70 and the drive camshaft 44 is set so that the center of rotation of the drive camshaft 44 is located on the locus of the raceway surface 70a at the time of rotation of the control sleeve 70. Thereby, the control sleeve 70 is rotated so that the center of the raceway surface 70a corresponds to the center of rotation of the drive camshaft 44, whereby the operation state in which the driven cam lobe 50a for an interval in which the drive camshaft 44 makes one rotation has equal speed can be obtained.

Further, as the effect which can be provided based on the configuration of the variable intake valve operating apparatus 34, the following effect is cited.

More specifically, a spring reaction force from the valve spring 86 acts on, via the driven cam lobe 50a, the link mechanism 68 which revolves around the drive camshaft 44. The spring reaction force acts in the radial direction of the control sleeve 70 via the control roller 64 and the raceway surface 70a. Further, an inertia force from the link mechanism 68 in association with rotation of the drive camshaft 44 acts on the raceway surface 70a in the radial direction of the control sleeve 70 via the control roller 64. In the variable intake valve operating apparatus 34 of the present embodiment described above, the direction in which the control sleeve 70 is operated to change the operation angle of the intake valve 30 differs from the action direction (radial direction) of the above described spring reaction force and the like, and is the rotational direction (circumferential direction) of the control sleeve 70. Accordingly, even if the control sleeve 70 is rotationally driven in the direction against the component force in the circumferential direction of the above described spring reaction force and the like, the load torque of the actuator 76 in rotationally driving the control sleeve 70 to make the operation angle variable becomes small torque based on the component force in the circumferential direction. Therefore, according to the present variable intake valve operating apparatus 34, the load torque which acts on the actuator 76 can be significantly reduced.

Further, according to the variable intake valve operating apparatus 34 of the present embodiment, as the contact member which is in contact with the raceway surface 70a, the control roller 64 is adopted, and is rolled on the raceway surface 70a. Therefore, as compared with the case in which a member which performs contact with the raceway surface 70a by using slide is adopted as the above described contact member, friction and wear of the contact parts can be reduced.

Further, in the variable intake valve operating apparatus 34 of the present embodiment, the driven link 60 is not disposed at the rear side, but is disposed at the front side in the rotational direction of the drive camshaft 44 with respect to the drive arm part 52a and the drive link 56 with the control roller 64 interposed therebetween. According to the configuration like this, the force which is caused by the above described spring reaction force of the valve spring 86 and acts on the drive link 56 and the driven link 60 becomes a compression force instead of a tensile force and a bending force. Therefore, deformation and stress of the drive link 56 and the driven link 60 can be reduced, and the position of the control roller 64 (the rotation angle θ of the drive camshaft 44 and the driven cam lobe 50a) is more reliably determined.

(Relation Between the Lift Zone of the Intake Valve 30 and Acceleration/Deceleration Zones)

Next, with reference to FIG. 10, previously setting elements which give a main influence on the valve opening characteristics (shape of the lift curve) of the intake valve 30 which are realized by the variable intake valve operating apparatus 34 will be described.

Figure 10:
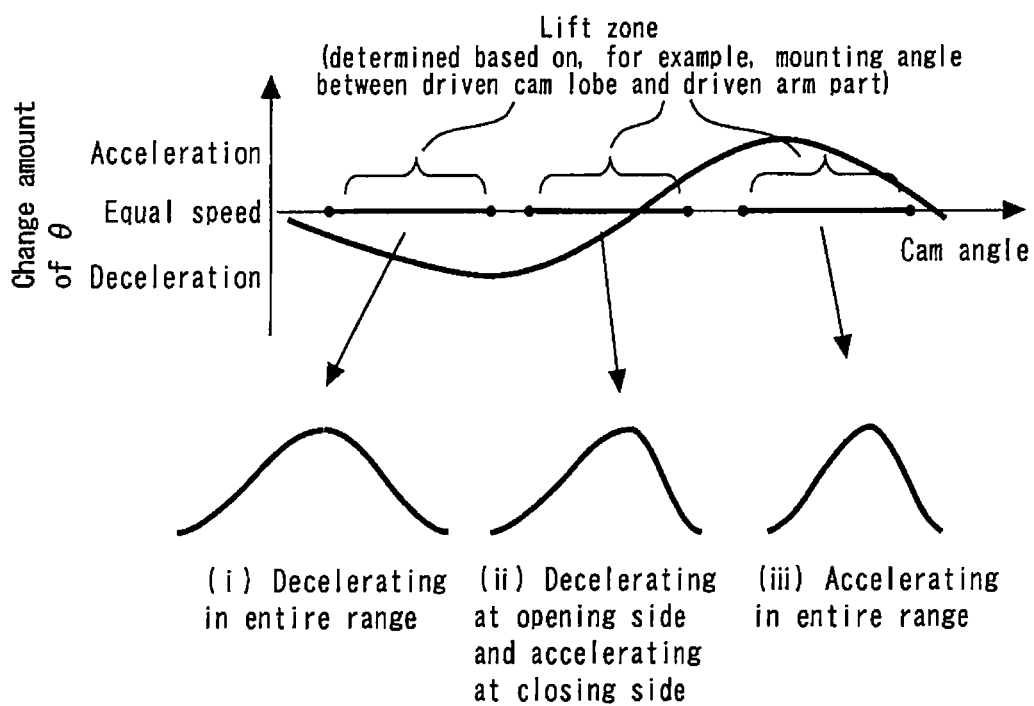
FIG. 10 is a diagram expressing a relation between the lift zone of the intake valve and the acceleration/deceleration zones.

FIG. 10 is a diagram expressing a relation between the lift zone of the intake valve 30 and the acceleration/deceleration zones. More specifically, the relation shown in FIG. 10 is the one in the eccentric state in which the center point of the raceway surface 70a is away from the center of rotation of the drive camshaft 44 (state in which the raceway surface 70a is controlled to be at a certain eccentric angle φ other than 0°). Further, the vertical axis of FIG. 10 represents a change amount of the rotation angle θ for an interval in which the drive camshaft 44 makes one rotation (corresponding to a change of a rotational speed (angular speed) of the driven cam lobe 50a with the rotational speed of the drive camshaft 44 (equal speed) as the reference).

When the moving range of the control roller 64 on the raceway surface 70a in the lift zone of the intake valve 30 changes in the eccentric state of the raceway surface 70a with the eccentric angle φ being other than 0° as shown in FIG. 10, setting of the relation between the lift zone and the acceleration/deceleration zones changes as the three cases illustrated as shown FIG. 10. This brings about changes in how the rotational speed of the driven cam lobe 50a is increased or decreased in the lift zone, and how the acceleration or deceleration amount of the driven cam lobe 50a in the lift zone changes. Therefore, the lift curve of the intake valve 30 changes in accordance with setting of the lift zone as shown in FIG. 10. For example, in the case of (i) in FIG. 10, the entire range of the lift zone belongs to the deceleration zone, and therefore, the lift curve is obtained, in which the change of the lift amount entirely becomes slow with respect to the lift curve at the time of the equal speed. In the case of (ii) in FIG. 10, the zone is switched from the deceleration zone to the acceleration zone halfway through the lift zone, and therefore, the lift curve is obtained, in which the change of the lift amount at the opening side becomes slow and the change of the lift amount at the closing side becomes fast with respect to the lift curvet at the time of the equal speed. Further, in the case of (iii) in FIG. 10, the entire range of the lift zone belongs to the acceleration zone, and therefore the lift curve is obtained, in which the change of the lift amount entirely becomes fast with respect to the lift curve at the time of the equal speed.

Here, the position (moving range) of the control roller 64 on the raceway surface 70a in the relation with the lift zone of the intake valve 30 can be changed by adjusting, for example, the mounting angle between the driven cam lobe 50a and the driven arm part 50b (driven shaft) on the cam piece 50. As a result, as illustrated as the three cases in FIG. 10, setting of the relation between the lift zone and the acceleration/deceleration zones can be changed.

On top of it, the shape of the pantographic link mechanism 68 determines the acceleration and deceleration amounts of the driven cam lobe 50a for an interval in which the drive camshaft 44 makes one rotation. The lift curve of the intake valve 30 is determined depending on in which part of the lift zone acceleration and deceleration are performed. More specifically, the factors which determine the acceleration and deceleration amounts of the driven cam lobe 50a are the length of the side of each link of the link mechanism 68, the eccentricity amount between the center of rotation of the drive camshaft 44 and the center of the raceway surface 70a (the moving amount of the raceway surface 70a in the plane direction orthogonal to the axial line of the drive camshaft 44) and the like. Further, the factors which determine setting of the relation between the lift zone and the acceleration/deceleration zones are the ratio of the length of the side of each link of the link mechanism 68, the shape of the locus (FIG. 4 and the like) of the center point of the raceway surface 70a and the like, in addition to the above described mounting angle. Further, the acceleration/deceleration zones of the driven cam lobe 50a for an interval in which the drive camshaft 44 makes one rotation become opposite depending on whether the driven cam lobe 50a is located at the front side in the rotational direction of the drive camshaft 44 with respect to the drive camshaft 44 as the configuration of the present embodiment shown in FIG. 4 and the like, or the driven cam lobe 50a is located at the rear side thereof conversely.

[Control of the Internal Combustion Engine Using the Variable Valve Operating Apparatus in Embodiment 1]

Next, with reference to FIG. 11 to FIG. 16, characteristic control of the internal combustion engine 10 using the variable intake valve operating apparatus 34 which has the configuration described above will be described.

Figure 11:
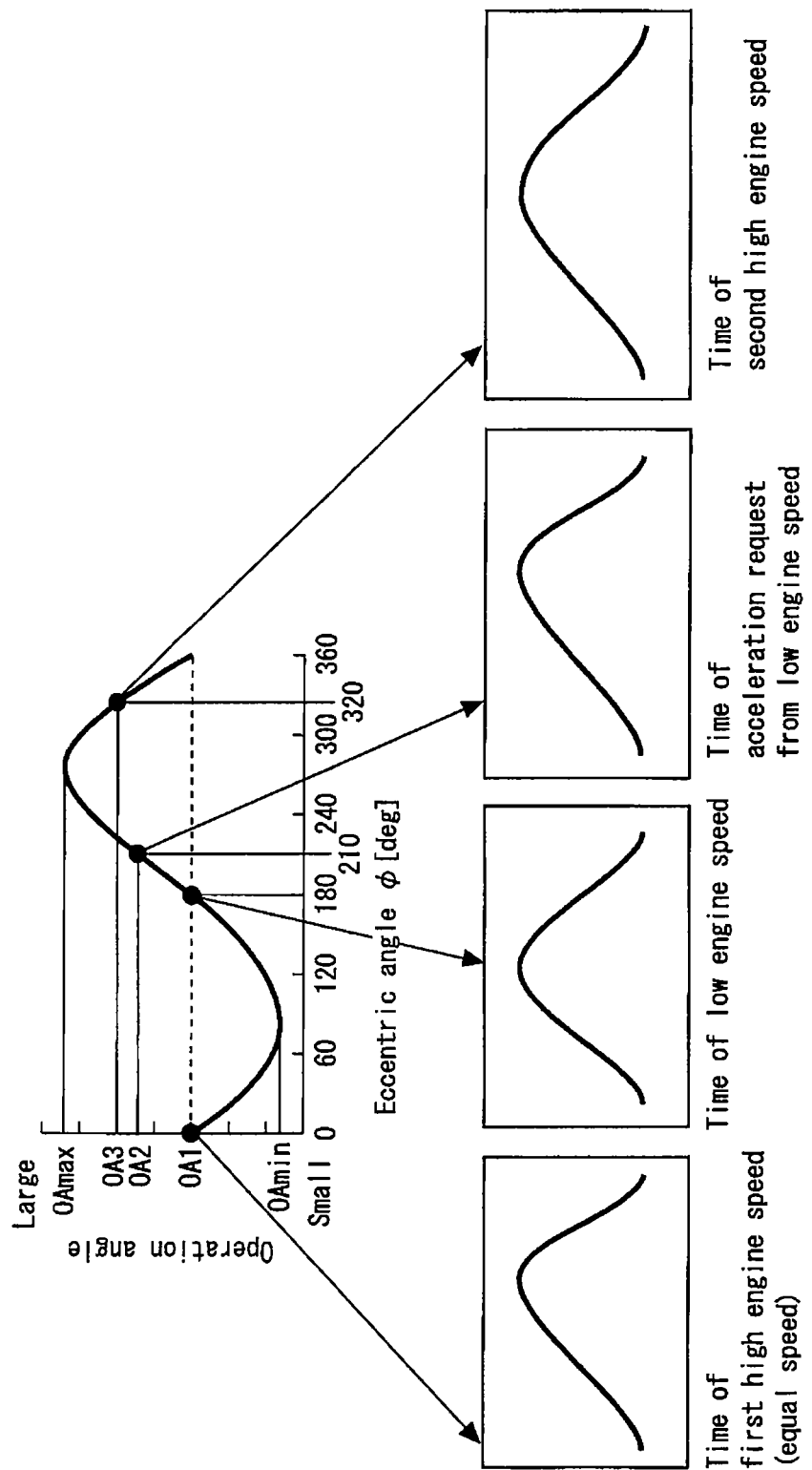
FIG. 11 is a diagram expressing a relation between the eccentric angle φ and each lift curve of the intake valve which is to be changed in accordance with the operation condition of the internal combustion engine in embodiment 1 of the present invention.

FIG. 11 is a diagram expressing a relation between the eccentric angle $\phi$ and each lift curve of the intake valve 30 which is to be changed in accordance with the operation condition of the internal combustion engine 10 in embodiment 1 of the present invention.

According to the variable intake valve operating apparatus 34 having the configuration described above, the control sleeve 70 is rotationally driven and the eccentric angle $\phi$ is changed, whereby the lift speed in each timing in the lift zone changes. As a result, the operation angle of the intake valve 30 can be changed while a timing at which the lift amount shows a peak (hereinafter, sometimes simply abbreviated as a "lift peak timing") is changed. Furthermore, in the present variable intake valve operating apparatus 34, the raceway surface 70a the center of which is eccentric with respect to the center of rotation of the control sleeve 70 which is rotationally driven by the actuator 76 is included, and rolling of the control roller 64 of the pantographic link mechanism 68 is guided by the raceway surface 70a. Thereby, as already described, the operation angle of the intake valve 30 can be made continuously variable in the characteristic mode in which the operation angle of the intake valve 30 is made variable in both directions of the reducing direction and the increasing direction as also shown in FIG. 11 when the control sleeve 70 is rotated in one direction.

Thus, in the present embodiment, the eccentric angle $\phi$ is changed in accordance with the operation conditions of the internal combustion engine 10 by using the aforementioned characteristic variable intake valve operating apparatus 34, whereby the lift curves of the intake valve 30 with the lift peak timings differing in accordance with the operation conditions are discriminatingly used as shown in FIG. 11.

More specifically, in the present embodiment, at the time of a first high engine speed which is higher than a first predetermined engine speed NE1 and is not higher than a second predetermined engine speed NE2 (at the time of use of a high rotational speed area which is assumed to be used during a normal operation of the internal combustion engine 10), 0° is selected as the eccentric angle $\phi$ which is a control amount of the actuator 76. The lift curve in the case of the eccentric angle $\phi$ being 0° is the one that is obtained when the driven cam lobe 50a rotates at an equal speed to the drive camshaft 44. In the present embodiment, the profile of the driven cam lobe 50a is set so that the lift peak timing of the lift curve which is obtained in this case is at a closing side with respect to the center of the valve opening time period (lift zone) (so that the intake air flow rate can be enhanced efficiently at the time of the first high engine speed).

Further, in the present embodiment, at the time of a low engine speed (except for an acceleration request time) which is not higher than the above described first predetermined speed NE1, 180° is selected as the eccentric angle $\phi$. When the eccentric angle $\phi$ is 180°, action of acceleration is exerted in the first half part of the lift zone, and action of deceleration is exerted in the following latter half part, as already described. As a result, the lift peak timing of the lift curve which is obtained in this case moves to the opening side as compared with the case of the eccentric angle $\phi$ being 0°, and is in a substantially center of the valve opening time period (timing which is slightly close to the closing side) as shown in FIG. 11. Further, in this case, as the entire valve opening time period, the action of acceleration and the action of deceleration cancel out each other, and the operation angle of the intake valve 30 becomes the same value OA1 as in the case of the eccentric angle $\phi$ being 0° (the equal speed time).

Further, in the present embodiment, when an acceleration request (high load request) is issued in the above described low engine speed time, the eccentric angle $\phi$ is changed to 210° (one example) from 180°. In the lift curve in the case of the eccentric angle $\phi$ being set as 210°, the rotational speed of the driven cam lobe 50a is relatively decreased in the initial time of start of lift of the intake valve 30, as compared with the case of the eccentric angle $\phi$ being 180°. As a result, the lift amount in the predetermined zone in the vicinity of the opening timing of the intake valve 30 is small as compared with the case of the eccentric angle $\phi$ being 180°. Furthermore, as compared with the eccentric angle $\phi$ being 180°, the lift peak timing moves to the closing side, and the operation angle becomes large (OA2).

Furthermore, in the present embodiment, at a time of a second high engine speed which is higher than the above described second predetermined engine speed NE2 (at the time when the engine speed irregularly increases or the like), 320° (one example) is selected as the eccentric angle $\phi$. When the eccentric angle is 320°, the rotational speed of the driven cam lobe 50a is decreased in the substantially entire lift zone including a predetermined zone (a ramp section at the closing side) in the vicinity of the closing timing of the intake valve 30 as compared with the case of the eccentric angle φ being 0°. As a result, as compared with the case of the eccentric angle φ being 0°, the lift peak timing moves to the closing side, and the operation angle becomes large (OA3).

Figure 12:
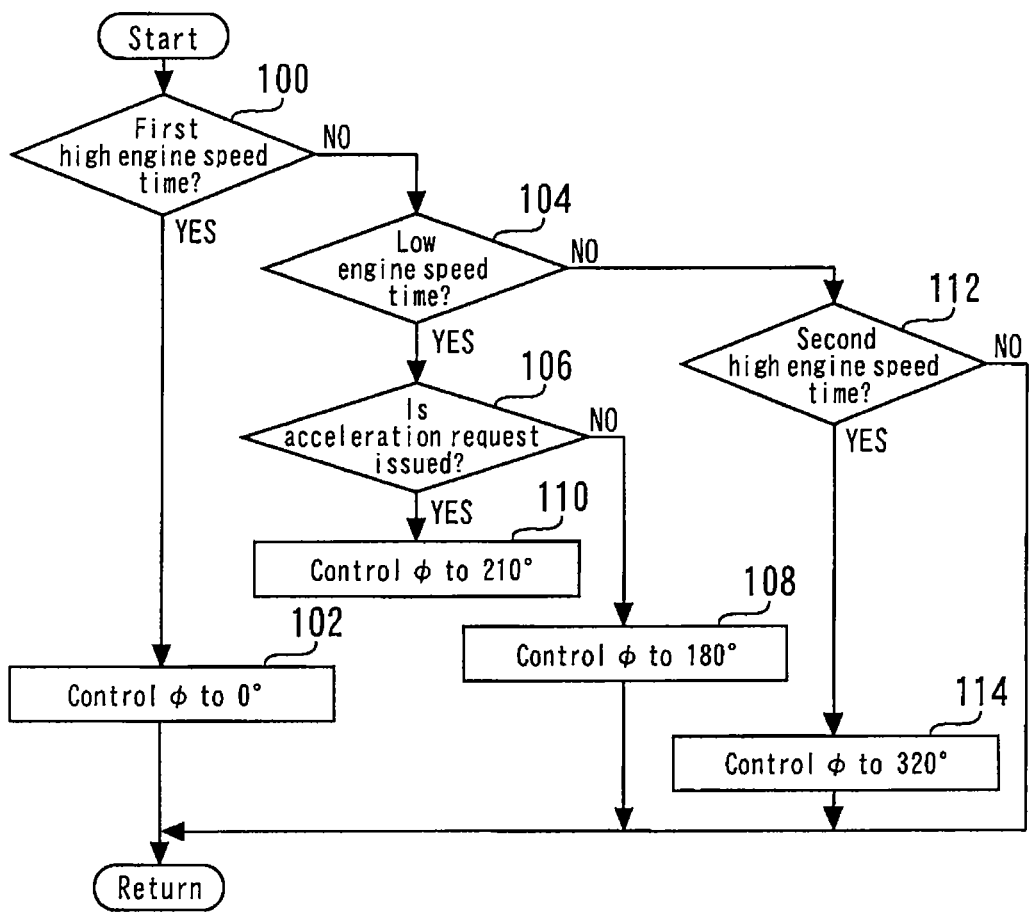
FIG. 12 is a flowchart of a routine that is executed in embodiment 1 of the present invention.

FIG. 12 is a flow chart showing a control routine which the ECU 40 executes in order to realize the control of the variable intake valve operating apparatus 34 described above in accordance with the operation conditions of the internal combustion engine 10. The present routine is repeatedly executed at each predetermined control period.

In the routine shown in FIG. 12, it is determined whether or not the engine is in the time of the first high engine speed in which the present engine speed is higher than the first predetermined engine speed NE1 and is not higher than the second predetermined engine speed NE2 (NE2>the first predetermined engine speed NE1) based on the output of the crank angle sensor 38 (step 100). When it is determined that the engine is in the time of the first high engine speed as a result, 0° is used as the eccentric angle φ (step 102).

Meanwhile, when it is determined that the engine is not in the time of the first high engine speed in the above described step 100, it is determined whether or not the engine is in the low engine speed time in which the present engine speed is not higher than the above described first predetermined engine speed NE1 (step 104). When it is determined that the engine is in the low engine speed time as a result, next, it is determined whether or not an acceleration request (high load request) is issued from a driver based on the accelerator pedal position which is detected by the accelerator position sensor 42 (step 106).

When the determination of the above described step 106 is not established, that is to say, at the time of the low engine speed without the acceleration request being issued, 180° is used as the eccentric angle φ (step 108). Meanwhile, when the determination of the above described step 106 is established, that is to say, when it is determined that an acceleration request is issued at the time of the low engine speed, 210° is used as the eccentric angle φ (step 110).

Meanwhile, when the determination of the above described step 104 is not established, next, it is determined whether or not the present engine speed is higher than the above described second predetermined engine speed NE2 (step 112). When the determination of the present step 112 is established as a result, 320° is used as the eccentric angle φ (step 114). The second predetermined engine speed NE2 is the value which is set in advance as the threshold value which enables determination of whether or not the present engine speed is the engine speed which can ensure normal mobility of the variable intake valve operating apparatus 34 at the time of a high engine speed. Further, the processing of the present step 114 may be also applied to the variable exhaust valve operating apparatus 36.

According to the control routine shown in FIG. 12 described above, the eccentric angle φ is changed in accordance with the operation conditions of the internal combustion engine 10, whereby the lift curves of the intake valve 30 with different lift peak timings can be discriminatingly used in accordance with the operation conditions. Next, the effect which is obtained by each control of the eccentric angle φ in accordance with the operation conditions of the internal combustion engine 10 will be described.

First, with reference to FIG. 13 and FIG. 14, control of switching the eccentric angle φ between 180° and 0° in accordance with the value of the engine speed will be described.

Figure 13:
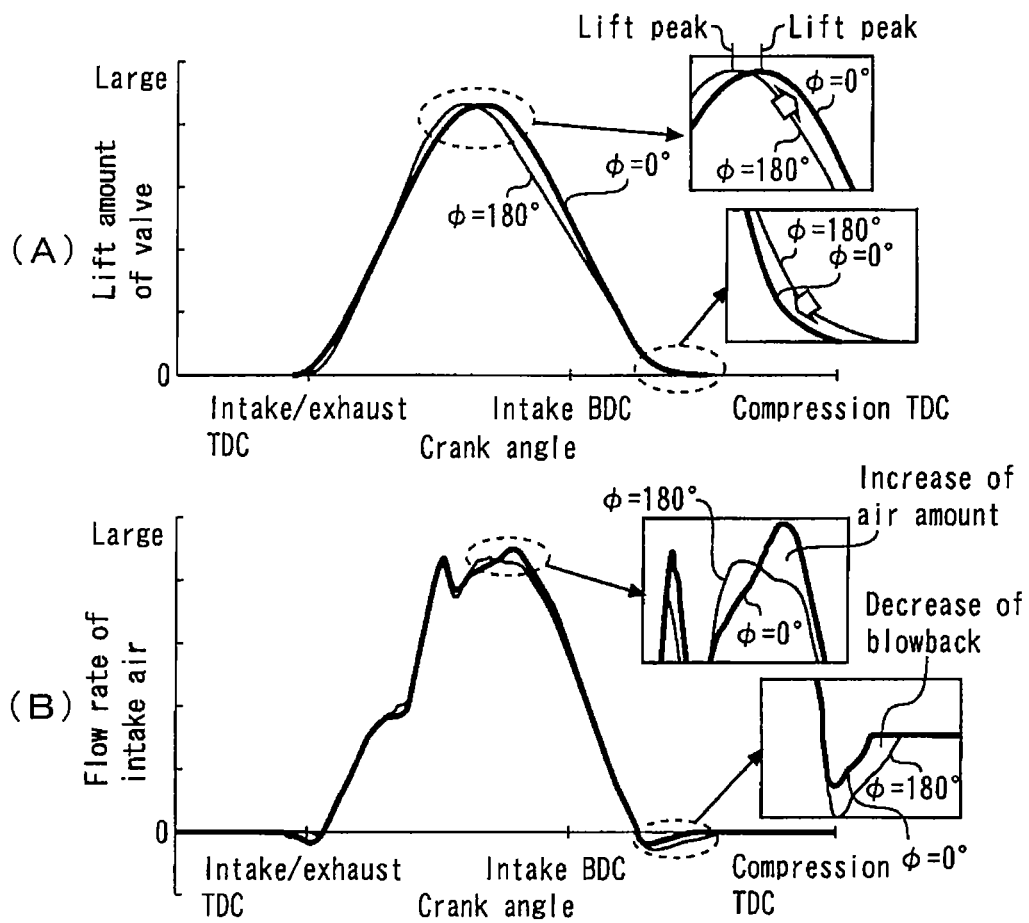
FIG. 13 is a view comparing the lift curves of the intake valve and the flow rates of the intake air which is taken into the cylinder during the lift zone in the case of the eccentric angle φ being 0° and in the case of the eccentric angle φ being 180°.

FIG. 13 is a view comparing the lift curves of the intake valve 30 and the flow rates of the intake air which is taken into the cylinder during the lift zone in the case of the eccentric angle φ being 0° and in the case of the eccentric angle φ being 180°. In FIG. 13(A), for comparison, the opening timings of the two lift curves are matched with each other by using the VVT mechanism 48. Further, FIG. 13(B) expresses a difference of the intake air flow rates due to a difference of the above described two lift curves in the same operation condition (at the time of the first high engine speed).

Here, the conventional variable valve operating apparatus in which the operation angle of the valve is made variable on the precondition that the drive camshaft is rotationally driven by using the rotational force of the crankshaft differs from the variable intake valve operating apparatus 34 of the present embodiment, and is the one in which when the actuator (control shaft) is controlled in one direction, the operation angle of the valve increases unidirectionally with the lift amount, and when the actuator is controlled in the opposite direction, the operation angle of the valve decreases unidirectionally with the lift amount as described in, for example, Japanese Laid-Open Patent Application Publication No. 2009-57868. Accordingly, in the conventional variable valve operating apparatus like this, the lift curve with only one characteristic (one shape) can be obtained for one operation angle. This is not limited to the variable valve operating apparatus which makes the operation angle of the valve continuously variable as the one described in the above described publication, but also applies to the variable valve operating apparatus which makes the operation angle of the valve variable stepwise.

In contrast with this, according to the variable intake valve operating apparatus 34 of the present embodiment, the lift curve φ32 180°) which is used at the time of the low engine speed and the lift curve (φ=0°) which is used at the time of the first high engine speed are equal in the operation angle and differ in the lift peak timing as already described and shown in FIG. 13(A). Further, in the present embodiment, as shown in FIG. 13(A) by being enlarged, the lift curve (φ=0°) which is used at the time of the first high engine speed is set to have a lower lift amount of the predetermined section in the vicinity of the closing timing than the lift curve (φ=180°) which is used at the time of the low engine speed.

Figure 14:
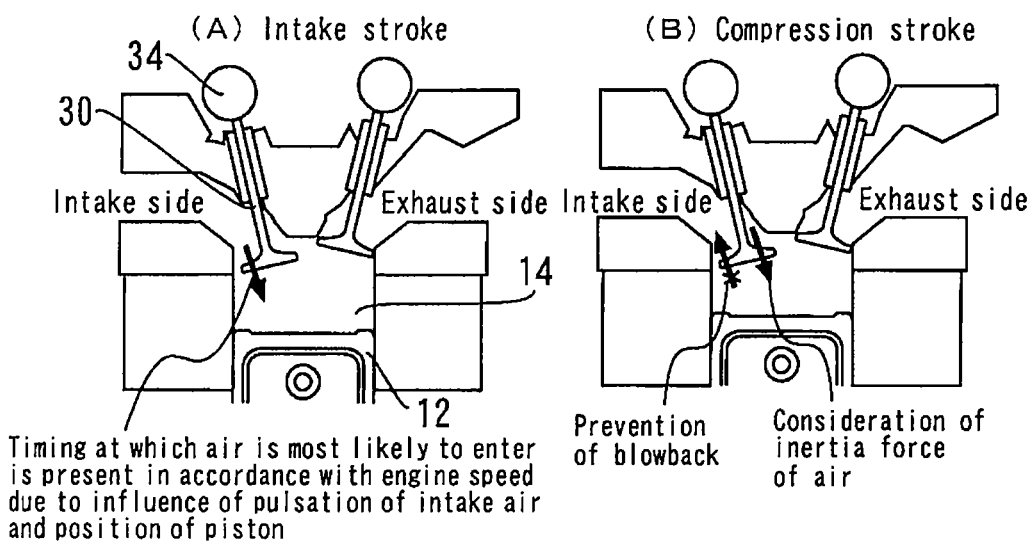
FIG. 14 is a view for explaining a behavior of intake air in an intake stroke and a compression stroke.

FIG. 14 is a view for explaining a behavior of intake air in an intake stroke and a compression stroke.

As the measures for enhancing the output power of the internal combustion engine 10, it is effective to enhance torque by increase of the intake air amount. When air flows into the cylinder as shown in FIG. 14(A) during the lift zone of the intake valve 30, timing in which much air easily enter is present due to the influence of the pulsation of the intake air and the position of the piston 12. Such timing changes in accordance with the engine speed. More specifically, as the engine speed becomes higher, the above described timing becomes relatively later. Further, when the engine speed becomes high, the inertia force of the air taken into the cylinder becomes large, and therefore, even after the piston passes the intake bottom dead center (BDC), air flows into the cylinder as shown in FIG. 13(B). However, if the intake valve 30 is kept in the opened state for a long time after entering the compression stroke, the amount of air which is charged in the cylinder decreases due to blowback to the intake passage 16 side. Accordingly, the closing timing of the intake valve 30 needs to be determined in consideration of the influence of the inertia force of air and prevention of blowback, as shown in FIG. 14(B).

However, in the case of the conventional variable valve operating apparatus of the configuration in which the operation angle of the intake valve changes in only one direction (any one of the increasing direction and the decreasing direction) with the lift amount when the actuator is controlled in one direction, as in the variable valve operating apparatus of the configuration shown in the above described publication, the following problem occurs. More specifically, if the operation angle and the lift amount of the intake valve are increased with increase of the engine speed in order to obtain a high lift amount in timings at which much air easily enters, the closing timing of the intake valve is delayed, and therefore, the charge air amount in the cylinder cannot be favorably ensured due to the influence of blowback as a result. Conversely, if the closing timing of the intake valve is set to a timing in which blowback does not occur, a sufficient lift amount cannot be ensured in timings in which much air easily enters.

In contrast with this, according to the variable intake valve operating apparatus 34 of the present embodiment, the lift peak timing of the lift curve ($\phi=0°$) at the time of the first high engine speed which is used at a higher engine speed side than the lift curve at the time of the low engine speed ($\phi=180°$) can be deviated to the closing side in agreement with increase in the engine speed. Thereby, a large lift amount can be ensured in the timings in which much air easily enters irrespective of the value of the engine speed, as shown in FIG. 13(A) and FIG. 13(B) by being enlarged, and therefore, the charge air amount in the cylinder can be enhanced. Further, even when the lift peak timings are deviated between the two lift curves as described above, decrease of the charge air amount in the cylinder due to the influence of blowback of the intake air as in the case of the conventional variable valve operating apparatus can be prevented.

Further, in the lift curve at the time of the first high engine speed ($\phi=0°$), the lift amount of the predetermined section in the vicinity of the closing timing is set to be small as compared with the lift curve at the time of the low engine speed ($\phi=180°$) as shown in FIG. 13(A) by being enlarged, whereby blowback of the intake air also can be decreased more as shown in FIG. 13(B) by being enlarged.

As above, the eccentric angle $\phi$ is changed between 180° and 0° in accordance with the value of the engine speed, whereby the output performance can be favorably enhanced by torque enhancement of the internal combustion engine 10 in association with increase in the intake air flow rate.

Next, control of selecting 210° as the eccentric angle when an acceleration request is issued at the time of the low engine speed will be described with reference to FIG. 15.

Figure 15:
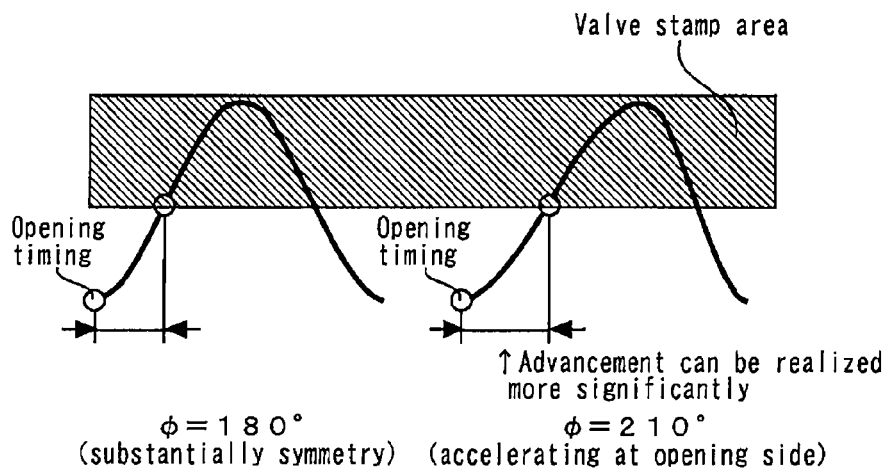
FIG. 15 is a diagram which compares the two lift curves with the eccentric angles φ of 180° and 210°, in relation with a valve stamp area.

FIG. 15 is a diagram which compares the two lift curves with the eccentric angles $\phi$ of 180° and 210°, in relation with a valve stamp area.

In order to increase a valve overlap amount with the valve opening time period of the exhaust valve 32 and the valve opening time period of the intake valve 30 overlapping each other, it is effective to advance the opening timing of the intake valve 30 with respect to the intake and exhaust top dead center. However, if the advance amount of the opening timing of the intake valve 30 is too large, interference of the piston 12 and the intake valve 30 (so-called valve stamp) is feared. The area shown by applying hatching in FIG. 15 shows "valve stamp area" of the lift amount of the intake valve 30 in which valve stamp occurs.

In the lift curve at the time of the eccentric angle $\phi$ being 210°, the lift amount in the predetermined section in the vicinity of the opening timing of the intake valve 30 is small as already descried, with respect to the lift curve at the time of the eccentric angle $\phi$ being 180° (the lift curve in which the lift peak timing is in the substantially center of the valve opening time period). Therefore, as compared with the lift curve at the time of the eccentric angle $\phi$ being 180°, a long valve opening time period until reaching the valve stamp area from the opening timing can be secured as shown in FIG. 15. Thereby, when 210° is selected as the eccentric angle $\phi$, the opening timing of the intake valve 30 (more specifically, the entire lift curve) can be advanced more significantly by using the VVT mechanism 48, as compared with the case in which 180° is selected.

In the present embodiment, when an acceleration request (high load request) is issued in the above described low engine speed time, 210° is selected as the eccentric angle $\phi$. Thereby, the valve overlap amount is effectively increased at the time of acceleration. Therefore, in the internal combustion engine 10 including the turbo supercharger 22, a scavenging effect is enhanced by increase of the valve overlap amount in the state in which the intake pressure becomes higher than the exhaust pressure at the time of acceleration. As a result, the supercharging pressure can be effectively enhanced, and therefore the output performance of the internal combustion engine 10 can be enhanced. Further, if it is under the situation in which the intake pressure is lower than the exhaust pressure at the time of acceleration, an internal EGR gas amount is increased by increase of the valve overlap amount. As a result, the fuel consumption performance and exhaust emission performance of the internal combustion engine 10 can be enhanced. In the lift curve in the example shown in FIG. 15 ($\phi=210°$), the rotational speed of the driven cam lobe 50a increases at the closing side, and the rate of acceleration at the time of seating of the intake valve 30 becomes high. However, the time of using the present lift curve is the time of an acceleration request from the time of the low engine speed in which the rotational speed of the drive camshaft 44 is low, and therefore, it can be said that no problem arises in securing normal mobility of the variable intake valve operating apparatus 34.

Next, with reference to FIG. 16, control of selecting 320° as the eccentric angle $\phi$ at the time of the second high engine speed will be described.

Figure 16:
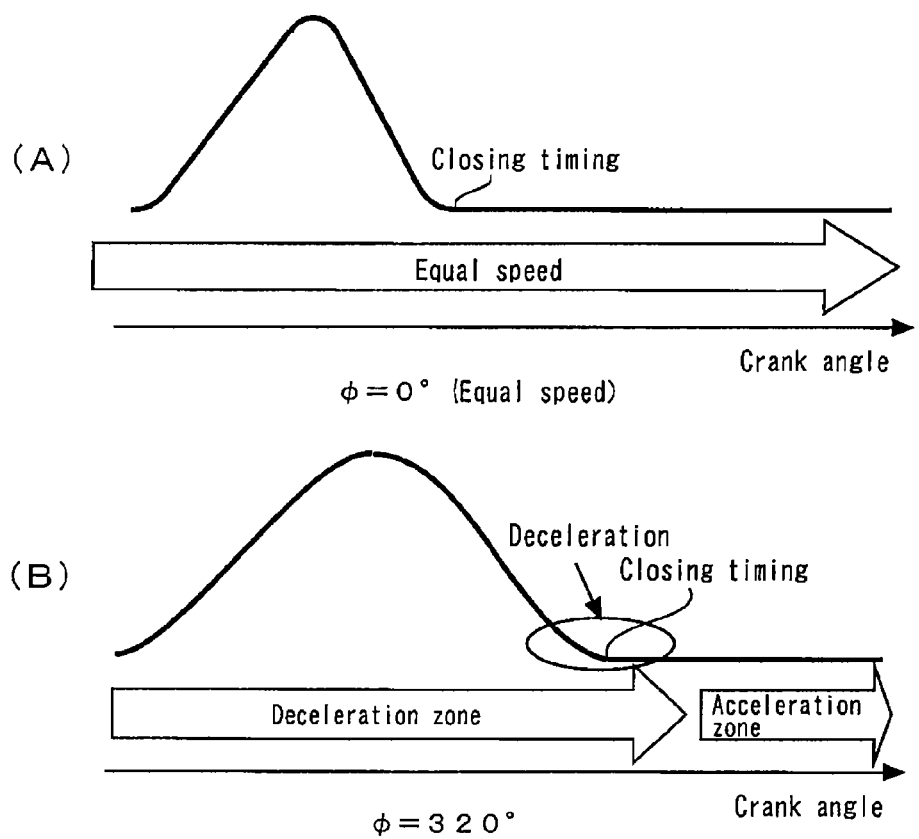
FIG. 16 is a diagram which compares the lift curve with the eccentric angle φ of 320° with the lift curve (φ=0°) at the time of the equal speed.

FIG. 16 is a diagram which compares the lift curve with the eccentric angle $\phi$ of 320° with the lift curve ($\phi=0°$ at the time of the equal speed.

As already described and as shown in FIG. 16, when the eccentric angle $\phi$ is 320°, the rotational speed of the driven cam lobe 50a decreases in the substantially entire lift zone including a predetermined section (the ramp section at the closing side) in the vicinity of the closing timing of the intake valve 30 as compared with the case in which the eccentric angle $\phi$ is 0°. In the present embodiment, 320° is used as the eccentric angle $\phi$ in the above described second high engine speed time. As the time of the second high engine speed higher than the second predetermined engine speed NE2, the time is applicable, in which the engine speed is unintentionally increased more than the normal use range due to an operation error of a transmission in the case of the vehicle equipped with the internal combustion engine 10 including a manual transmission, for example.

When the high engine speed which is not assumed to be used originally is used as in the above described second high engine speed time, the rotational speed of the driven cam lobe 50a is high. Therefore, keeping normal mobility of the variable intake valve operating apparatus 34 becomes difficult. More specifically, in such a case, occurrence of valve jump and valve bounce is feared. When such valve bounce occurs, occurrence of failures such as breakage of the component of the valve train and falling-off of the rocker arm 82 is feared.

In the present embodiment, when the engine speed is increased more than the second predetermined engine speed NE2 which is set in advance as the threshold value of the engine speed capable of securing normal mobility, the lift curve (φ=320°) shown in FIG. 16(B) is selected. Thereby, the rotational speed of the driven cam lobe 50a in the vicinity of the closing timing (ramp section) can be decreased. As a result, the lift acceleration in the vicinity of the actual closing timing of the intake valve 30 (acceleration of the intake valve 30 at the time of seating) can be decreased.

According to the above described control, even in the case of the situation exceeding the second predetermined engine speed NE2 due to some reason including the above described irregular case, valve bounce and the like can be avoided. Therefore, reliability of the variable intake valve operating apparatus 34 (similar to the case of being applied to the variable exhaust valve operating apparatus 36) can be enhanced. Further, in the example shown in FIG. 16(B), the predetermined section (ramp section) in the vicinity of the opening timing is also included in the deceleration zone, and therefore, occurrence of valve jump and the like in the opening side also can be effectively prevented. As the degree of influence on valve bounce, the degree of influence is larger in the section in the vicinity of the closing timing than in the section in the vicinity of the opening timing, and therefore, a higher priority is given to effective deceleration in the predetermined section in the vicinity of the closing timing. Further, when the eccentric angle φ is 320°, the base lift zone after the intake valve 30 is closed becomes the acceleration zone as shown in FIG. 16(B), but the load from the driven cam lobe 50a side does not act on the intake valve 30, and therefore, the failures as described above do not occur.

Incidentally, in embodiment 1 described above, as the eccentric angle φ which is the control amount of the actuator 76, 0° (equal speed state) and 180° are used, whereby the two lift curves of the intake valve 30 with the same operation angle and different lift peak timings can be obtained. However, in the present invention, the first and the second lift curves in which the same or the substantially same operation angle value is obtained, and the timings in which the lift amounts show the peaks are different from each other are not limited to the lift curves obtained by the above described eccentric angles φ (0° and 180°). More specifically, citing the case having the setting of the operation angle and the eccentric angle φ shown in FIG. 8(A) as an example, with respect to any operation angle value OAx other than the operation angle OA1 in the predetermined operation angle variable range (from OAmin to OAmax), the values of two eccentric angles φx1 and φx2 which realize the operation angle value OAx exist. Even though the eccentric angles φx1 and φx2 are the eccentric angles at the time of realizing the same operation angle value OAx, if the values of the eccentric angles φ differ from each other, in what timing of the lift zone the acceleration/deceleration zones arrive differs, and the acceleration and deceleration amounts differ, and therefore, the lift peak timings thereof differ from each other. Accordingly, depending on the characteristic (shape) of the lift curve which is required of the variable valve operating apparatus in accordance with the operation conditions, the eccentric angles φx1 and φx2 at the time of realizing the same value as an arbitrary operation angle value OAx may be used besides the combination of 0° and 180°. Further, the operation angle value which is used in this case is not limited to strictly the same value, and may be the value which can be regarded as substantially the same.

Further, in the variable valve apparatuses 34 and 36 of embodiment 1 described above, in order to obtain the two lift curves of the intake valve 30 with the same operation angle and different lift peak timings, the raceway surface 70a the center of which is eccentric with respect to the center of rotation of the control sleeve 70 which is rotationally driven by the actuator 76 is included, and rolling of the control roller 64 of the pantographic link mechanism 68 is guided by the raceway surface 70a. However, in the present invention, the configuration of the actuator which moves the raceway surface in the plane direction orthogonal to the axial line of the drive camshaft in order to obtain the first and the second lift curves with the operation angle value being the same or substantially the same is not limited to the above described configuration. More specifically, in what timing of the lift zone of the valve the acceleration/deceleration zones arrive, and what acceleration and deceleration amounts are obtained change depending on in what direction the raceway surface moves in the above described plane. Thus, the actuator in the present invention may be configured, for example, to be able to move the guide member including the raceway surface reciprocally between the control position of the raceway surface for obtaining the first lift curve (for example, the control position of the raceway surface 70a shown in FIG. 7(A)), and the control position of the raceway surface for obtaining the second lift curve (for example, the control position of the raceway surface 70a shown in FIG. 7(C)).

Further, in embodiment 1 described above, there is described the control which is with the intake valve 30 as the main target, and discriminatingly uses, in accordance with the operation conditions of the internal combustion engine 10, a plurality of lift curves differing in lift peak timing by using the variable intake valve operating apparatus 34. However, the control in the present invention is not limited to the control with the intake valve 30 as the target, but may be control which is with an exhaust valve as the target and discriminatingly uses, in accordance with the operation conditions of the internal combustion engine, a plurality of lift curves differing in lift peak timing.

Further, in embodiment 1 describe above, the control which changes the eccentric angle φ which is the control amount of the actuator 76 in accordance with the operation conditions of the internal combustion engine 10 is described with the engine speed as the main control parameter. However, the parameter for determining the operation conditions of the internal combustion engine in controlling the control amount of the actuator in the present invention is not limited to the engine speed, and may be another control parameter (for example, an engine load).

Further, in embodiment 1 described above, an example of discriminatingly using 180° and 0° as the eccentric angle φ under the two kinds of operation conditions differing in engine speed (the above described low engine speed time and the above described first high engine speed time) is described. However, the present invention is not limited to the example described above as long as the first rotation angle and the second rotation angle are discriminatingly used under at least two kinds of operation conditions differing in the engine speed. More specifically, the operation condition in which the first rotation angle or the second rotation angle is used may be under a plurality of operation conditions respectively.

Further, in embodiment 1 described above, the raceway surface 70a which is formed as a circumferential surface is included. Thereby, when the control sleeve 70 is moved in such a manner that the center of rotation of the drive camshaft 44 and the center line of the raceway surface 70a correspond to each other, the rotational speed of the driven cam lobe 50a for an interval in which the drive camshaft 44 makes one rotation can be made an equal speed. However, the raceway surface in the present invention does not always have to be a circumferential surface. For example, the raceway surface which is formed into an elliptical shape may be adopted.

Further, in embodiment 1 described above, the description is made by citing the configuration as an example, in which the relative positional relation between the control sleeve 70 and the drive camshaft 44 is set so that the center of rotation of the drive camshaft 44 is located on the locus of the center point of the raceway surface 70*a*, as seen from the axial direction of the drive camshaft 44. However, the variable valve operating apparatus of the present invention is not necessarily limited to the one that has the above described setting. More specifically, the variable valve operating apparatus may have the setting of the center of rotation of the drive camshaft 44 deviating from the locus of the center point of the raceway surface 70*a* as seen from the axial direction of the drive camshaft 44.

Further, in embodiment 1 described above, the control sleeve 70 having the raceway surface 70*a* is included for each cylinder as the guide member, and the control sleeves 70 of the respective cylinders are simultaneously rotationally driven by the motor 80 via the one control shaft 78. However, the present invention is not limited to the configuration like this, and the control sleeve 70 included for each cylinder as the guide member may be rotationally driven for each cylinder with the individually included electric motor, for example.

In embodiment 1 described above, the description is made with the configuration cited as an example, in which the operation force of the driven cam lobe 50*a* is transmitted to the intake valve 30 (valve) via the rocker arm 82 having the rocker roller 82*a*. However, the variable valve operating apparatus in the present invention is not limited to the one having the configuration as described above, and may be the one that is configured so that the driven cam lobe directly drives the valve via a valve lifter, for example.

Further, in embodiment 1 described above, the cam piece 50 integrally having the two driven cam lobes 50*a* is included at the drive camshaft 44 for each cylinder in the rotatable mode. However, the present invention is not limited to the configuration like this, and may be the one in which individual driven cam lobes are rotatably supported by the drive camshaft individually, for example. The present invention may be the one that includes, for example, the link mechanism such as the link mechanism 68, the guide member having the raceway surface such as the raceway surface 70*a*, and the actuator such as the actuator 76, for each of the individual driven cam lobes.

Further, in embodiment 1 described above, the link mechanism 68 which is a four joint link connected in a pantograph shape (rhombic shape) by use of the drive arm part 52*a* and the driven arm part 50*b* having the axis center of the drive camshaft 44 as the common center of rotation, and the drive link 56 and the driven link 60 (in other words, used at the angle side in which the above described rotation angle θ is less than 180°). However, the link mechanism in the present invention is not necessarily limited to the one having the configuration like this, and may be the one that is a four joint link which is used at the angle side in which the above described rotation angle θ is larger than 180°, for example.

In embodiment 1 described above, the control sleeve 70 corresponds to "guide member" in the present invention, the control roller side rotary shaft 62 and the control roller 64 correspond to "contact member" in the present invention, and the link plate 66 and the holding roller 72 correspond to "contact maintaining means" in the present invention. Further, "control means" in the present invention is realized by the ECU 40 executing a series of processes of the routine shown in the above described FIG. 12.

Further, in embodiment 1 described above, 180° and 0° of the eccentric angles φ respectively correspond to "first rotation angle" and "second rotation angle" in the present invention. Further, the lift curve at the time when the eccentric angle φ is 180° (the above described low engine speed time) and the lift curve at the time when the eccentric angle φ is 0° (the above described first high engine speed time) respectively correspond to "first lift curve" and "second lift curve" in the present invention.

DESCRIPTION OF SYMBOLS 10 internal combustion engine
12 piston
14 combustion chamber
16 intake passage
18 exhaust passage
20 air flow meter
22 turbo supercharger
24 throttle valve
26 fuel injection valve
28 ignition plug
30 intake valve
32 exhaust valve
34 variable intake valve operating apparatus
36 variable exhaust valve operating apparatus
38 crank angle sensor
40 ECU (Electronic Control Unit)
42 accelerator position sensor
44 drive camshaft
46 timing pulley
48 variable valve timing (VVT) mechanism
50 cam piece
50*a* driven cam lobe
50*a*1 base circle part of driven cam lobe
50*a*2 nose part of driven cam lobe
50*b* driven arm part of driven cam lobe
52 drive arm
52*a* drive arm part of drive arm
54 camshaft side rotary shaft
56 drive link
58 cam lobe side rotary shaft
60 driven link
62 control roller side rotary shaft
64 control roller
66 link plate
68 link mechanism
70 control sleeve (guide member)
70*a* raceway surface of control sleeve
70*b* gear of control sleeve
72 holding roller
74 holding rotary shaft
76 actuator
78 control shaft
78*a*, 78*b* gear of control shaft
80 electric motor
80*a* output shaft of electric motor
80*b* gear at electric motor side
82 rocker arm
82*a* rocker roller
84 hydraulic lash adjuster
86 valve spring

The invention claimed is:

1. A variable valve operating apparatus for an internal combustion engine, comprising:
a drive camshaft that is rotationally driven by a rotational force of a crankshaft;

a driven cam lobe that is concentric with the drive camshaft, and is rotatably supported by the drive camshaft;
a guide member that has a raceway surface formed so as to surround the drive camshaft;
a link mechanism that is connected to each of the drive camshaft and the driven cam lobe, has a contact member which is in contact with the raceway surface, and changes a rotation angle of the driven cam lobe with respect to the drive camshaft in association with a positional change of the contact member with respect to a center of rotation of the drive camshaft;
a contact maintaining device that maintains contact between the contact member that revolves around the drive camshaft and the raceway surface, while the drive camshaft makes one rotation;
an actuator that moves the raceway surface in a plane direction orthogonal to an axial line of the drive camshaft; and
a controller that is configured to control a control amount of the actuator to change a moving amount of the raceway surface in the plane direction, in accordance with an operation condition of the internal combustion engine,
wherein, in a state in which a center of the raceway surface is eccentric from a center of rotation of the drive camshaft, a distance of the contact member with respect to the center of rotation of the drive camshaft is changed while the drive camshaft makes one rotation.

2. The variable valve operating apparatus for an internal combustion engine according to claim 1,
wherein the actuator rotationally drives the guide member,
wherein the raceway surface is a circumferential surface, and is included by the guide member in a state in which the center of the raceway surface is eccentric with respect to a center of rotation of the guide member, and
wherein the control amount of the actuator by the controller is a rotation angle of the guide member.

3. The variable valve operating apparatus for an internal combustion engine according to claim 2,
wherein the controller includes at least a first rotation angle and a second rotation angle as target values of the rotation angle of the guide member,
wherein the first rotation angle is a rotation angle of the guide member at a time when a predetermined operation angle value for an operation angle of a valve which is driven by the driven cam lobe is obtained,
wherein the second rotation angle is a rotation angle of the guide member at a time when a same or substantially the same operation angle value as the operation angle value which is obtained at a time of control to the first rotation angle is obtained, and when a second lift curve with timing in which a lift amount shows a peak differing as compared with a first lift curve of the valve which is obtained at the time of the control to the first rotation angle is obtained, and
wherein the controller discriminatingly uses the first rotation angle and the second rotation angle under at least two kinds of operation conditions which differ in engine speed from each other.

4. The variable valve operating apparatus for an internal combustion engine according to claim 3,
wherein the valve is an intake valve,
wherein the second lift curve is set so that timing in which the lift amount shows the peak is delayed as compared with the first lift curve, and wherein the controller uses the second rotation angle in an operation condition with a higher engine speed than an operation condition for which the first rotation angle is used.

5. The variable valve operating apparatus for an internal combustion engine according to claim 4,
wherein the second lift curve is set so that a lift amount in a predetermined section in a vicinity of a closing timing of the valve becomes small as compared with the first lift curve.

6. The variable valve operating apparatus for an internal combustion engine according to claim 1,
wherein a valve which is driven by the driven cam lobe is an intake valve, and
wherein when an acceleration request is issued at a time of a low engine speed, the controller controls the control amount of the actuator so that a relative rotational speed of the driven cam lobe with respect to the drive camshaft increases in a predetermined section in a vicinity of an opening timing of the intake valve.

7. The variable valve operating apparatus for an internal combustion engine according to claim 1,
wherein when an engine speed is higher than a predetermined speed, the controller controls the control amount of the actuator so that a relative rotational speed of the driven cam lobe with respect to the drive camshaft decreases in a predetermined section in a vicinity of a closing timing of a valve which is driven by the driven cam lobe.

8. A variable valve operating apparatus for an internal combustion engine, comprising:
a drive camshaft that is rotationally driven by a rotational force of a crankshaft;
a driven cam lobe that is concentric with the drive camshaft, and is rotatably supported by the drive camshaft;
a guide member that has a raceway surface formed so as to surround the drive camshaft;
a link mechanism that is connected to each of the drive camshaft and the driven cam lobe, has a contact member which is in contact with the raceway surface, and changes a rotation angle of the driven cam lobe with respect to the drive camshaft in association with a positional change of the contact member with respect to a center of rotation of the drive camshaft;
contact maintaining means that maintains contact between the contact member that revolves around the drive camshaft and the raceway surface, while the drive camshaft makes one rotation;
an actuator that moves the raceway surface in a plane direction orthogonal to an axial line of the drive camshaft; and
control means that controls a control amount of the actuator to change a moving amount of the raceway surface in the plane direction, in accordance with an operation condition of the internal combustion engine,
wherein, in a state in which a center of the raceway surface is eccentric from a center of rotation of the drive camshaft, a distance of the contact member with respect to the center of rotation of the drive camshaft is changed while the drive camshaft makes one rotation.

\* \* \* \* \*